United States Patent
Bender et al.

(10) Patent No.: US 12,379,124 B2
(45) Date of Patent: Aug. 5, 2025

(54) AIR CLEANING SYSTEM UTILIZING OUTSIDE AIR PARAMETERS

(71) Applicant: IONaer International Arizona, LLC, Scottsdale, AZ (US)

(72) Inventors: Timothy M. Bender, Scottsdale, AZ (US); Perry Pauley, Glendale, AZ (US); Brian Keith Roper, Phoenix, AZ (US); Todd K. Roper, Glendale, AZ (US)

(73) Assignee: IONaer International Arizona, LLC, Scottsdale, AZ (US)

( * ) Notice: Subject to any disclaimer, the term of this patent is extended or adjusted under 35 U.S.C. 154(b) by 0 days.

(21) Appl. No.: 17/675,909

(22) Filed: Feb. 18, 2022

(65) Prior Publication Data
US 2023/0266032 A1   Aug. 24, 2023

(51) Int. Cl.
| | |
|---|---|
| F24F 11/63 | (2018.01) |
| G05B 19/042 | (2006.01) |
| F24F 110/22 | (2018.01) |
| F24F 110/52 | (2018.01) |
| F24F 110/64 | (2018.01) |
| F24F 110/65 | (2018.01) |
| F24F 110/66 | (2018.01) |
| F24F 110/70 | (2018.01) |
| F24F 110/72 | (2018.01) |
| F24F 110/74 | (2018.01) |

(52) U.S. Cl.
CPC ............ *F24F 11/63* (2018.01); *G05B 19/042* (2013.01); *F24F 2110/22* (2018.01); *F24F 2110/52* (2018.01); *F24F 2110/64* (2018.01); *F24F 2110/65* (2018.01); *F24F 2110/66* (2018.01); *F24F 2110/70* (2018.01); *F24F 2110/72* (2018.01); *F24F 2110/74* (2018.01); *G05B 2219/2614* (2013.01)

(58) Field of Classification Search
CPC .................................................. F24F 2110/52
See application file for complete search history.

(56) References Cited

U.S. PATENT DOCUMENTS

| | | | |
|---|---|---|---|
| 6,791,815 | B1 | 9/2004 | Graham |
| 8,048,370 | B1 | 11/2011 | Barnes |
| 8,747,754 | B2 | 6/2014 | Abate |
| 9,907,874 | B2 | 3/2018 | Bender et al. |

(Continued)

FOREIGN PATENT DOCUMENTS

| | | |
|---|---|---|
| CN | 104907173 B | 9/2015 |
| CN | 107062483 A | 8/2017 |

(Continued)

*Primary Examiner* — Nathan L Laughlin
(74) *Attorney, Agent, or Firm* — SNELL & WILMER L.L.P.

(57) ABSTRACT

A system or method utilizes one or more outside sensors to measure one or more outside air parameters, and optionally one or more inside sensors to measure inside air parameters. A processor is configured to at least partially control the operation of an air cleaner based on at least one of the one or more outside air paraments, or a comparison of at least one of the one or more outside air parameters to at least of one of the one or more inside air parameters. The system and method may use artificial intelligence to provide additional information to the controller to assist in controlling the air cleaner.

21 Claims, 31 Drawing Sheets

(56) References Cited

U.S. PATENT DOCUMENTS

| | | |
|---|---|---|
| 9,908,081 B2 | 3/2018 | Bender et al. |
| 9,908,082 B2 | 3/2018 | Bender et al. |
| 10,350,541 B2 | 7/2019 | Bender et al. |
| 10,357,586 B2 | 7/2019 | Bender et al. |
| 10,363,332 B2 | 7/2019 | Bender et al. |
| 10,363,522 B2 | 7/2019 | Bender et al. |
| 10,406,476 B2 | 9/2019 | Bender et al. |
| 11,007,478 B2 | 5/2021 | Bender et al. |
| 11,331,622 B2 | 5/2022 | Bender et al. |
| 11,577,195 B2 | 2/2023 | Bender et al. |
| 2001/0031234 A1 | 10/2001 | Christodoulatos et al. |
| 2003/0106788 A1 | 6/2003 | Babko-Malyi |
| 2004/0007000 A1 | 1/2004 | Takeda et al. |
| 2004/0247497 A1 | 12/2004 | Yuen |
| 2007/0253860 A1 | 11/2007 | Schroder |
| 2008/0035472 A1 | 2/2008 | Lepage |
| 2008/0063577 A1 | 3/2008 | Crowe |
| 2008/0317802 A1 | 12/2008 | Lee et al. |
| 2009/0202397 A1 | 8/2009 | Parker et al. |
| 2010/0089240 A1 | 4/2010 | Krichtafovitch |
| 2014/0198426 A1 | 7/2014 | Abate |
| 2015/0017059 A1 | 1/2015 | Arlemark |
| 2015/0076082 A1 | 3/2015 | Loucaides |
| 2016/0067645 A1 | 3/2016 | Mutha et al. |
| 2016/0263263 A1 | 9/2016 | Robert |
| 2017/0189846 A1 | 7/2017 | Cho et al. |
| 2017/0321877 A1 | 11/2017 | Bender et al. |
| 2017/0333587 A1 | 11/2017 | Bender et al. |
| 2017/0333837 A1 | 11/2017 | Bender et al. |
| 2017/0333838 A1 | 11/2017 | Bender et al. |
| 2017/0348636 A1 | 12/2017 | Bender et al. |
| 2018/0036677 A1 | 2/2018 | Bender et al. |
| 2018/0193508 A1 | 7/2018 | Bender et al. |
| 2018/0193509 A1 | 7/2018 | Bender et al. |
| 2018/0193794 A1 | 7/2018 | Bender et al. |
| 2019/0374669 A1 | 12/2019 | Bender et al. |
| 2020/0009502 A1 | 1/2020 | Bender et al. |
| 2020/0009503 A1 | 1/2020 | Bender et al. |
| 2020/0224913 A1* | 7/2020 | Paddock .................. F24F 11/46 |
| 2022/0260267 A1* | 8/2022 | Hipp ......................... B64F 5/40 |
| 2022/0339312 A1* | 10/2022 | Cecchi ...................... A61L 9/20 |
| 2022/0354982 A1* | 11/2022 | Johns ........................ A61L 9/20 |
| 2022/0404056 A1* | 12/2022 | Bloemer .................. F24F 11/52 |
| 2023/0042065 A1* | 2/2023 | Douglas .................. G05B 15/02 |
| 2023/0092341 A1* | 3/2023 | Josserand ................ F24F 11/58 |

FOREIGN PATENT DOCUMENTS

| | | |
|---|---|---|
| CN | 206583003 U | 10/2017 |
| CN | 113685986 A | 11/2021 |
| JP | S59193158 A | 11/1984 |
| KR | 101461849 B1 | 11/2014 |
| KR | 20160014336 A | 2/2016 |
| KR | 20180007206 A | 1/2018 |
| KR | 102238936 B1 | 4/2021 |
| WO | 2016183237 A1 | 11/2016 |
| WO | 2019147501 A1 | 8/2019 |

* cited by examiner

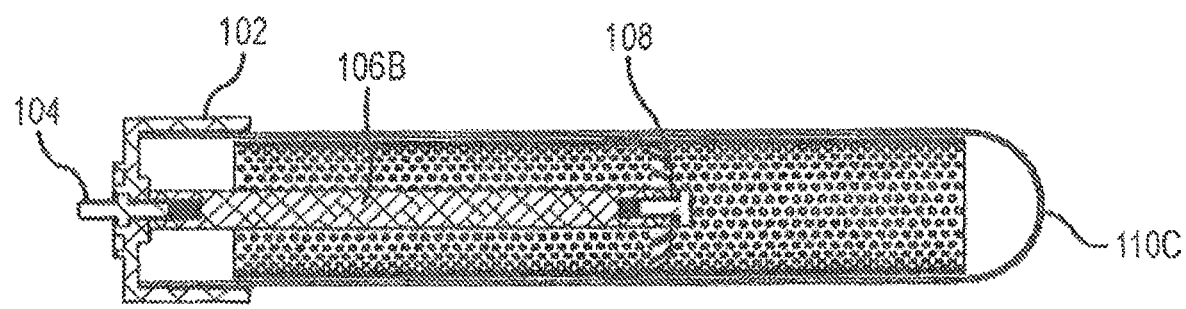
FIG. 10
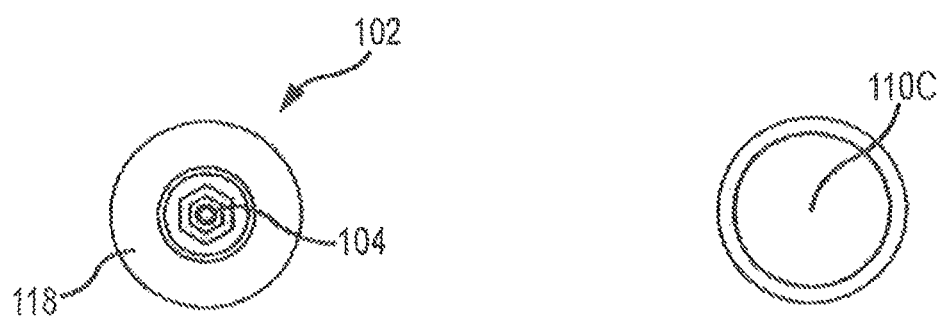 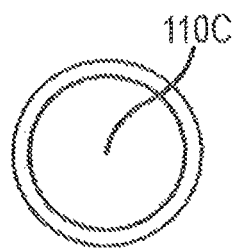
FIG. 11      FIG. 12

AIR CLEANING SYSTEM UTILIZING OUTSIDE AIR PARAMETERS

BACKGROUND

Prior approaches to, and devices for, air cleaning (also referred to herein as air purification) operate based on time periods, manual control, constant operation, or by measuring some parameter of the air inside of the space (sometimes referred to herein as the "inside space" or "inside air space") in which cleaned air is released. These systems do not take into account one or more parameters of the air outside of the inside space (sometimes referred to herein as the "outside air" or "outdoor air"). Some air outside of the inside space, particularly air outside of a building, eventually enters the inside space through gaps or spaces in the building, by doors and windows being opened, or in other ways.

SUMMARY OF THE INVENTION

Disclosed are systems and methods for cleaning air that include an air cleaning device, one or more inside sensors, one or more outside sensors, and a processor. The one or more inside (or indoor) sensors (or air sensors) and one or more outside (or outdoor) sensors (or air sensors) may each include one or more sensors that measure one or more of the following in/of the air: (1) the amount of particulates, (2) the amount of negative and/or positive ions, (3) the amount of ozone ($O_3$), (4) the amount of carbon monoxide (CO), (5) temperature, (6) humidity, (7) the amount of carbon dioxide ($CO_2$), (8) the amount of sulfur dioxide ($SO_2$), (9) the amount of volatile organic chemicals (VOC), (10) the amount of nitrogen oxide (NO), (11) the amount of nitrogen dioxide ($NO_2$), (12) the amount of ammonia ($NH_3$), (13) the size of particulates, (14) the amount of silane ($SH_4$), (14) the type of particulates, such as whether the particulates are viruses or bacteria, and (15) wind speed. Other air parameters may also be measured and the one or more inside sensors need not be used.

A processor (or controller) is any suitable device that can communicate with the one or more outside sensors and the one or more inside sensors and that at least partially controls, directly or indirectly, the operation of the air cleaner. The processor can preferably compare one or more of the parameters measured by the one or more outside sensors to one or more of the parameters measured by the one or more inside sensors, and the processor at least partially controls, directly or indirectly, the operation of the air cleaning device based on the comparison. For example, the processor may operate the air cleaner to decrease the level of cleaning, increase the level of cleaning, maintain the current level of cleaning, turn the air cleaner off, or turn the air cleaner on.

The system may include a display that displays one or more of the measured parameters and/or functioning of the air cleaner. The system may provide an alert if a parameter is above a certain level and the alert may be one or more of a sound or a visual indicator on the display.

The air cleaning device itself may be any suitable device, such as one that uses filters, ionization, ultraviolet (UV) light, hydrogen peroxide ($H_2O_2$), humidity greater than the humidity of the air being cleaned, a combination of any of these, or any other air cleaning device. Disclosed herein is an exemplary ionization air cleaning device although this disclosure is not limited to an air ionization device.

The outside air may be air outside of a building (or other structure such as a vehicle) or air inside of a building (or other structure such as a vehicle), but outside of the inside space into which the cleaned air is released.

The following are incorporated herein by reference: U.S. patent application Ser. No. 17/315,233 entitled "AIR IONIZATION SYSTEM AND METHOD," filed on May 7, 2021, U.S. Pat. Nos. 11,007,478, 10,350,451, 9,908,081, 9,907,874, and 9,908,082.

BRIEF DESCRIPTION OF THE DRAWINGS

FIG. 10 is a cross-sectional, side view of the air ionization unit of FIG. 9 taken along lines A-A.

FIG. 11 is an end view of the air ionization unit of FIG. 9.

FIG. 12 is the opposite end view of the air ionization unit of FIG. 9.

DETAILED DESCRIPTION

The following description is of various exemplary embodiments only, and is not intended to limit the scope of the present disclosure or claims. Changes may be made in the function and arrangement of the structures and functions described in these embodiments without departing from the scope of the claims.

Figure 1:
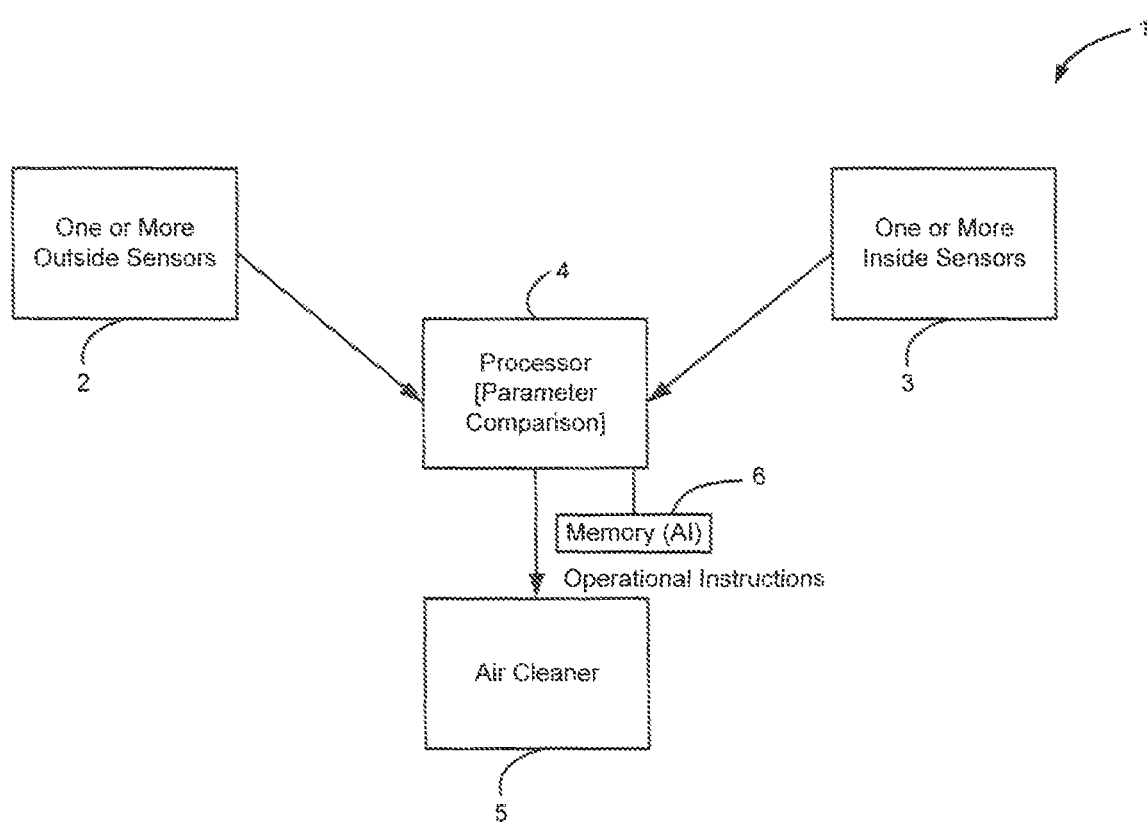
FIG. 1 is a block diagram of an air cleaning system according to this disclosure.
Figure 2:
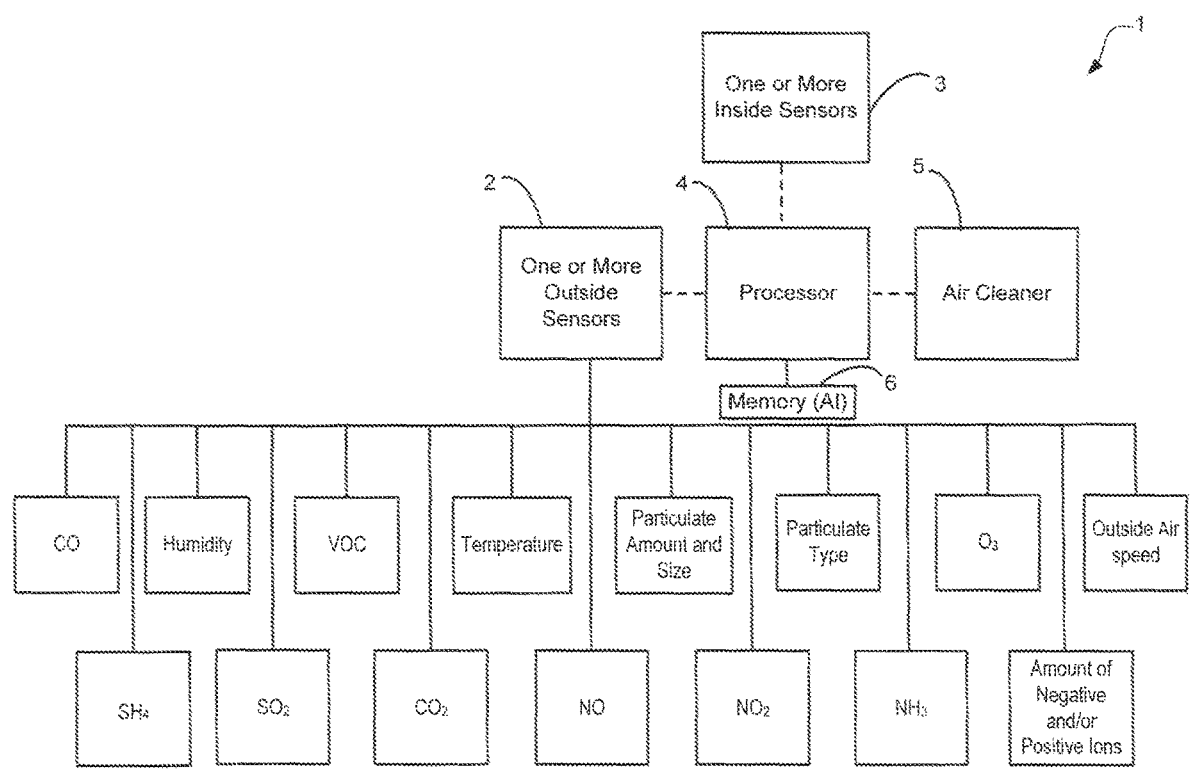
FIG. 2 is a block diagram of an air cleaning system with exemplary one or more outside sensors.
Figure 3:
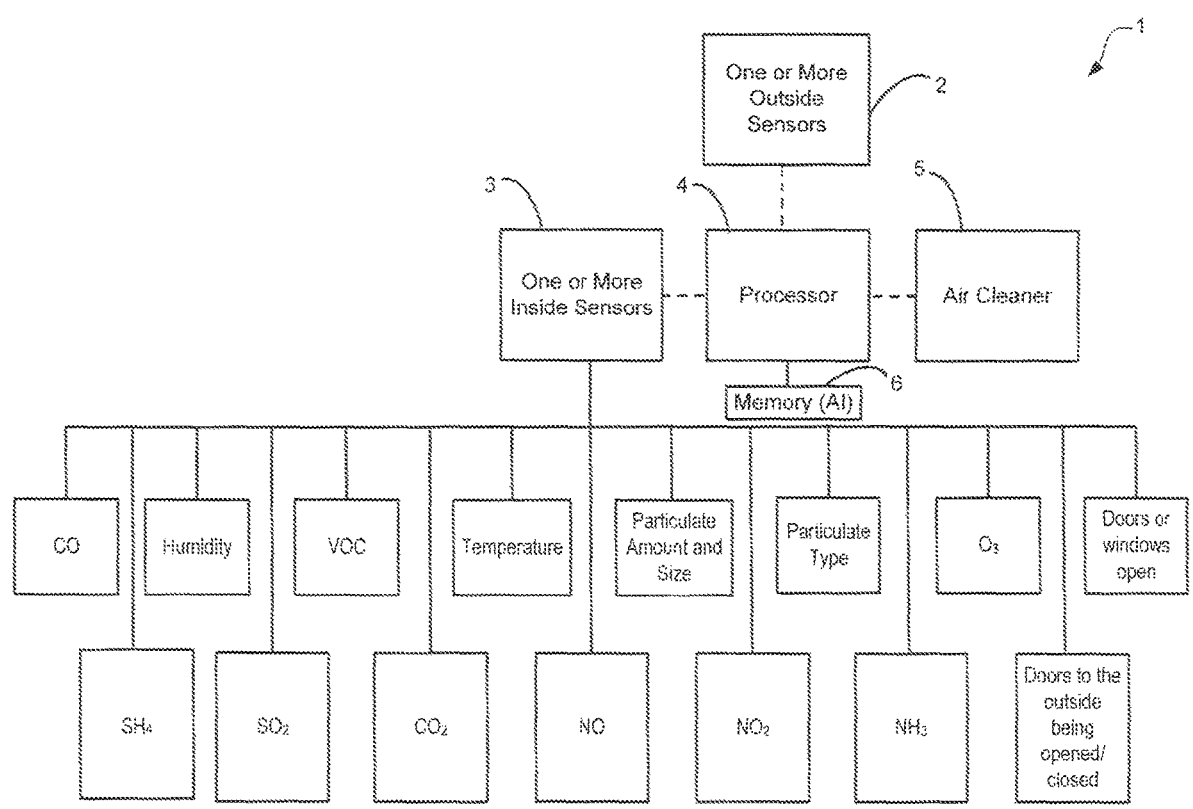
FIG. 3 is a block diagram of an air cleaning system with exemplary one or more inside air sensors according to this disclosure.

Turning now to the Figures, wherein the purpose is to disclose exemplary embodiments and not to limit the claims, FIG. 1 shows an air cleaning system (or "system") 1. System 1 generally includes (a) one or more outside sensors 2, (b) one or more inside sensors 3, (c) a processor 4, (d) an air cleaner 5, and (e) a memory 6. As shown in FIGS. 2 and 3, the one or more outside sensors 2 and/or one or more inside sensors 3 can include any suitable sensors, such as one or more sensors that measure the following in/of the air: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), (15) the amount of silane ($SH_4$), and (16) wind speed. These parameters are exemplary only and one or more other parameters may be measured and/or compared. For example, one or more sensors may measure whether a window or door is open and by how much, and/or the opening and closing of doors separating the inside space from the outside. Temperature may impact the efficacy of seals or structures in the building, e.g., they may expand at higher temperatures and contract at lower temperatures.

Each of the one or more outside air sensors 2 and the one or more inside sensors 3 are suitable sensors for measuring a given parameter.

Figure 4:
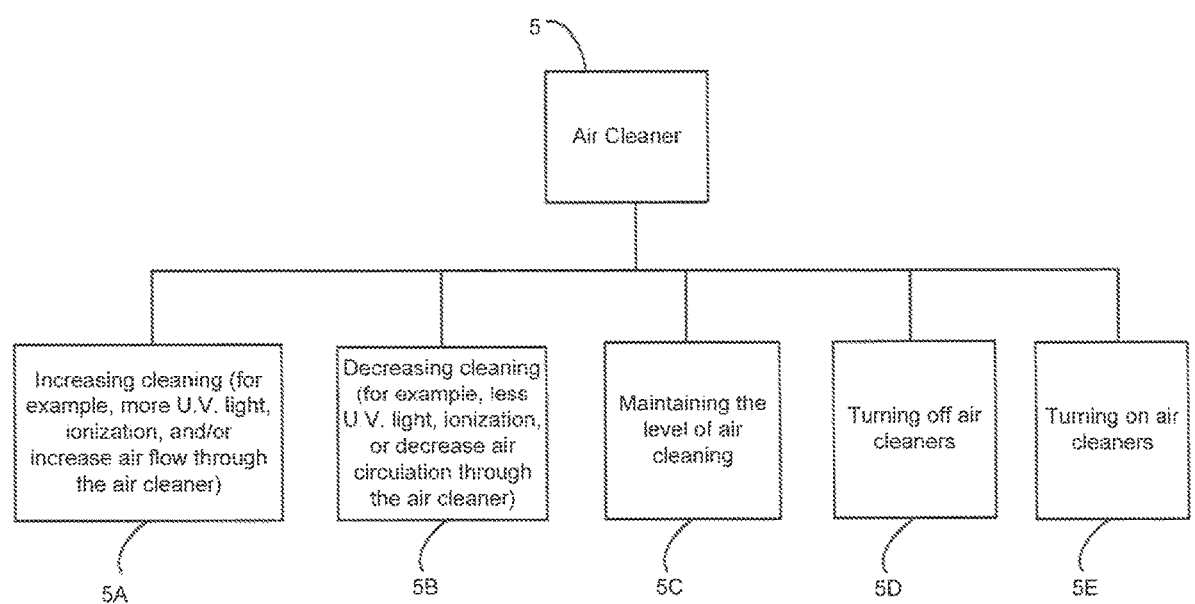
FIG. 4 is a block diagram of air cleaner operation modes.
Figure 5:
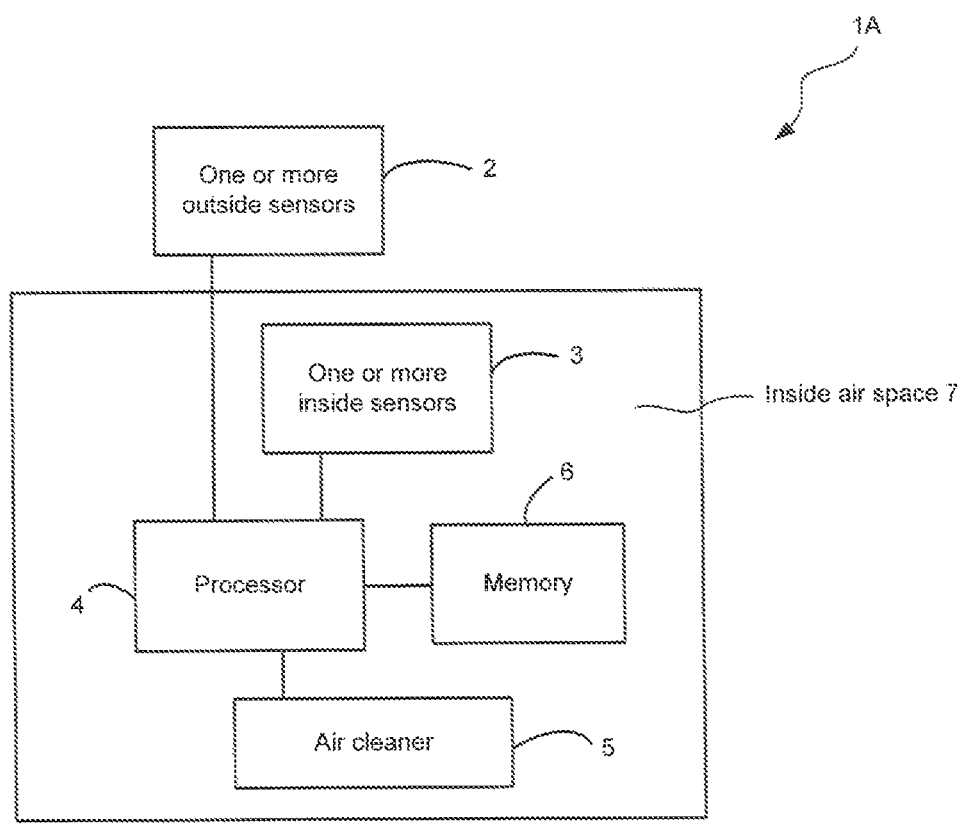
FIG. 5 is a block diagram of an air cleaning system according to this disclosure.

FIG. 4 shows operational modes of air cleaner 5, which as shown are (a) increasing air cleaning 5A, (b) decreasing air cleaning 5B, (c) maintaining the level of air cleaning 5C, (d) turning the air cleaner 5 off 5D, and (e) turning off the air cleaner on 5E. FIG. 5 shows one possible arrangement of the components of an air cleaning system 1A, in which the one or more outside sensors 2 are outside of the inside air space 7 and the one or more inside sensors 3, processor 4, air cleaner 5, and memory 6 are in the inside air space 7.

Figure 6:
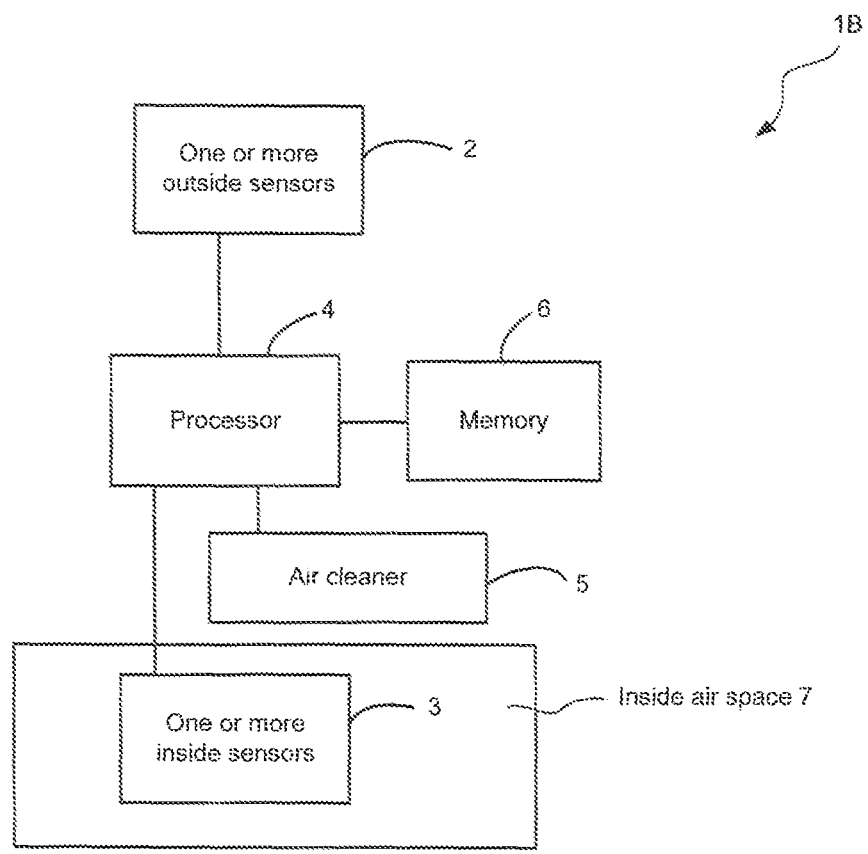
FIG. 6 is a block diagram of an air cleaning system according to this disclosure.
Figure 7:
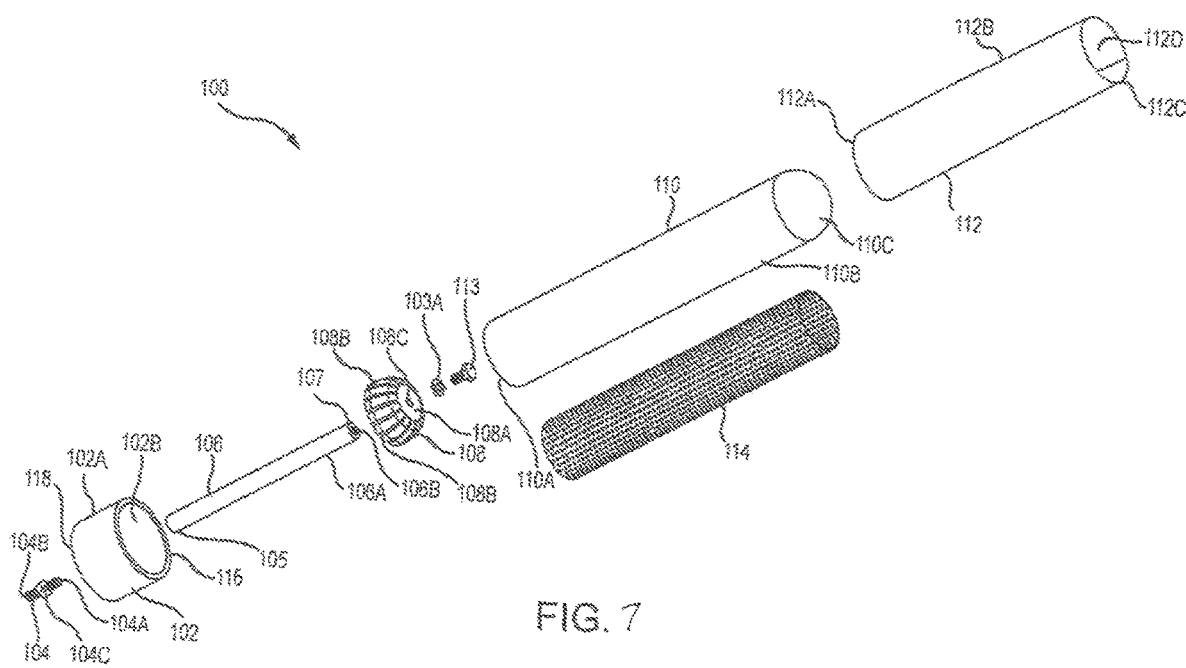
FIG. 7 is an exploded view of an air ionization unit in accordance with embodiments of this disclosure.
Figure 8:
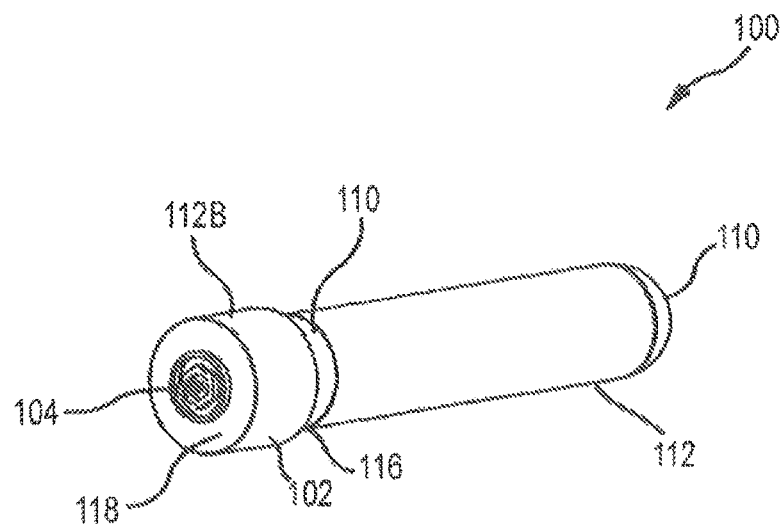
FIG. 8 is an assembled, perspective side view of the air ionization unit of FIG. 1.
Figure 9:
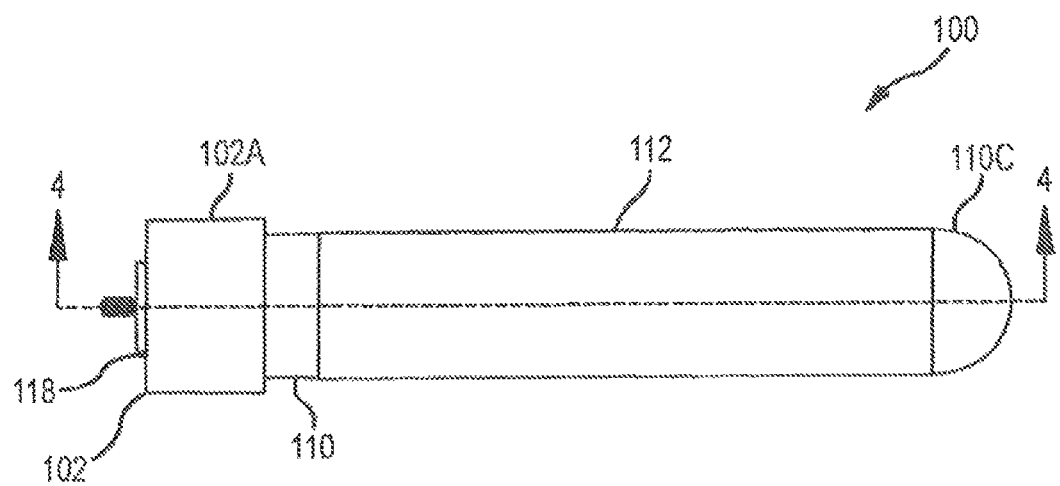
FIG. 9 is an assembled side view of the air ionization unit of FIG. 4 according to this disclosure.

FIG. 6 shows another possible arrangement of the components of air cleaning system 1B, in which the one or more inside sensors 3 are in the inside air space 7. The one or more outside sensors 3, processor 4, air cleaner 5, and memory 6 are all located outside of the inside air space 7.

FIGS. 5 and 6 are examples only. The one or more inside air sensors 3 should be in, or in communication with, the inside air space 7. The one or more outside air sensors 2 should be outside of the inside air space 7, or be in communication with the outside air, which is air outside of the inside air space for which outside parameter measurements are desired. The processor 4, memory 6, and air cleaner 5 could be at any suitable location.

Alternatively, the processor 4 may at least partially operate air cleaner 5 based solely on measurements from the one or more outside sensors 2 or the one or more inside sensors 3.

As an example, the outside air sensors 2 may be outside of inside air space 7 and are at any of one or more suitable locations, such as (1) on the outside of a building (or other structure, such as a bus, car, train, truck, airplane, or boat) in which the inside air space 7 is located, (2) inside of the building (or other structure, such as a bus, car, train, truck, airplane, or boat) in which the inside air space 7 is located, but outside of the inside air space 7, (3) positioned a suitable distance outside of and away from the building (or other structure) in which the inside air space 7 is located, (4) be provided by a third party, such as government or private weather monitoring service, to processor 4 via the Internet or other communications protocol, in which case no independent outside sensors need be provided.

One or more measurements from the one or more outside sensors 2 and from the one or be more inside sensors 3 are transmitted to processor 4 in any suitable wireless or wired manner. Like measurements, such as the measured outside $CO_2$ level and the measured inside $CO_2$ level, or the measured outside particulate level to the measured inside particulate level, may be compared by the processor. Based on the comparison, the processor 4 may send a signal (or command) with operational instructions to the air cleaner 5. For example, the processor 4, based in whole or in part on the comparison, may decrease 5B the level of air cleaning, increase 5A the level of air cleaning, maintain 5C the current level of air cleaning, turn the air cleaner off 5D, or turn the air cleaner on 5E.

Air cleaning system 1 may have a memory 6 that stores information related to (1) the time it takes for an amount of outside air to enter the inside air space 7 given measured parameters such as outside temperature, outside wind speed, whether one or more window or doors are open, and the time and frequency at which doors leading from the inside air space 7 to the outside are opened, and/or (2) the functioning of the air cleaner 5 required to clean air with certain parameters, such as a certain level of any of the parameters previously discussed. The memory 6 is part of or in communication with the processor 4. Historical information from the memory 6 may be used by the processor 4 in conjunction with the then currently measured parameters to determine the operation of air cleaner 5 by processor 4.

The memory 6 is optional and may have optional artificial intelligence (AI) functionality. The memory 6 preferably continuously stores information related to the functioning of the air cleaner 5 in response to commands from controller 4 based on parameters received by controller 4 from outside sensors 2 and/or inside sensors 3. The memory 6 can store the effectiveness of the operation of air cleaner 5 in maintaining an acceptable air quality level in inside air space 7 given the parameters previously recorded from one or more outside sensors 2 and/or one or more inside sensors 3. Based on the stored information the memory 6 with optional AI can communicate with processor 5 and, given the parameters presently being received by processor 4, compare those parameters to the stored information, including the prior operation of air cleaner 5 and the prior effectiveness related thereto (sometimes called "prior events") and adjust the command sent by processor 4 to air cleaner 5 in an effort to improve the operation of air cleaner 5 as compared to its prior operation and effectiveness. For example, if during a prior event an inside air parameter was at an unacceptable level for ten minutes, the processor 4 may command the air cleaner 5 to increase the air cleaning 5A a greater amount than it had for the prior event when faced with a current event similar to or the same as the prior event.

In this manner the air cleaning system 1, 1A, 1B, or other can predict the future air quality of the inside air based on one or more air quality parameters of the outside air because at least some of the outside air eventually enters the inside air space 7.

Based on these and potentially other factors, air cleaning system 1 can anticipate the future quality of inside air based at least in part on the outside air parameters and adjust the functioning of air cleaner 5 accordingly before or as the outside air enters the inside air space 7.

Thus, the quality of the inside air remains relatively constant and is less impacted by poorer quality outside air entering the inside air space 7.

Exemplary Air Cleaning Device

Turning now to FIGS. 7 through 12, a module 100 for ionizing air is shown. Module 100 as shown preferably has an end cap or "base" 102, an adapter 104, a coupler 106, an ion dispenser 108, a tube 110, an outer electrode 112, and an inner electrode 114. Base 102 is preferably comprised of any suitable plastic, for example injection-molded ABS (but preferably not ABS-PC), although any suitable material may be used. The purpose of base 102 is to receive coupler 106, ion dispenser 108, and tube 110.

Coupler 106 has a first end 105, a second end 107, an outer surface 106A, and a passageway 106B extending therethrough. In some embodiments, coupler 106 comprises a hollow aluminum rod. Moreover, coupler 106 may comprise a solid bar with an internal thread on each end. Coupler 106 may be configured to conduct electricity.

Adapter 104 as shown is a threaded shaft that bases through an opening (not shown in these Figures) of second end 118 of base 102 and is threadingly received in a passageway 106B at the first end 105 of coupler 106. The opening in second end 118 may also be threaded so as to threadingly receive adapter 104. In the preferred embodiment shown, adapter 104 is a threaded shaft with a first end 104A and a second end 104B. A nut 104C is threadingly received on the threaded shaft end 105 of coupler 106, which is aligned with the opening on the inside of second end 118. First end 104A passes through the opening and is threadingly received in passageway 106B of coupler 106 to retain coupler 106 against second end 118. In some exemplary embodiments, adapter 104 may comprise a solid stainless steel adapter with threaded ends and a central integral hex feature to facilitate rotation thereof.

An ion dispenser (also called an "umbrella shaped conductor") 108 is attached to second end 107 of coupler 106. In various exemplary embodiments, ion dispenser 108 may be configured with an umbrella-like shape. However, ion dispenser 108 may be configured with any suitable shape, as desired. Ion dispenser 108 operates to dispense electricity into inner electrode 114. Ion dispenser 108 as shown in this preferred embodiment is comprised of stainless steel (for example, stainless steel having a thickness of between about 0.006 inches and about 0.015 inches), has a top 108A for attachment to coupler 106, and a plurality of downward extending fingers 108B. In this preferred embodiment, ion dispenser 108 is attached to coupler 106 by aligning an opening in top 108A with passageway 106B at end 107 of coupler 106. Then fastener 113, which as shown is a bolt, is passed through opening 108C and threaded into passageway 106B. A lock washer 113A may be positioned between top 108A and the head of fastener 113.

Inner electrode 114 typically comprises a rolled perforated aluminum sheet, but may comprise any suitable material or combination of materials configured to act as a first electrode for purposes of ionization.

Outer electrode 112 typically comprises a tubular stainless steel wire mesh, for example a 0.008 in diameter Type 316 stainless steel wire mesh configured with a 20×20 per square inch grid. However, outer electrode 112 may comprise any suitable material or combination of materials configured to act as a second electrode for purposes of ionization.

A tube 110 is preferably glass (for example, comprised of borosilicate) and retains coupler 106 and ion dispenser 108. Tube 110 is also operative to insulate inner electrode 114 from outer electrode 112 and thus permit the development of a voltage potential therebetween in order to facilitate ionization. Tube 110 has a first, open end 110A, an outer surface 110B, and a second end 110C. Preferably, after cap 102, coupler 106, and ion dispenser 108 are assembled, inner electrode 114 is placed within tube 110, the first end 110A of tube 110 is positioned over ion dispenser 108 and coupler 106, and is received in cap 102 in a snug to slightly loose fit.

Outer electrode 112, which has a first end 112A, an outer surface 112B, a second end 112C, and an inner passage 112D, is positioned over tube 110. In the preferred embodiment shown, outer electrode 112 does not cover second end 110C of tube 110 or extend to cap 102.

In the preferred embodiment, when module 100 is assembled, coupler 106 and ion dispenser 108 are positioned approximately 50-60% inside the length of tube 110, although any suitable percentage is acceptable. In this manner, electrical current is delivered to the inside of, and approximately the center of, inner electrode 114.

Figure 13:
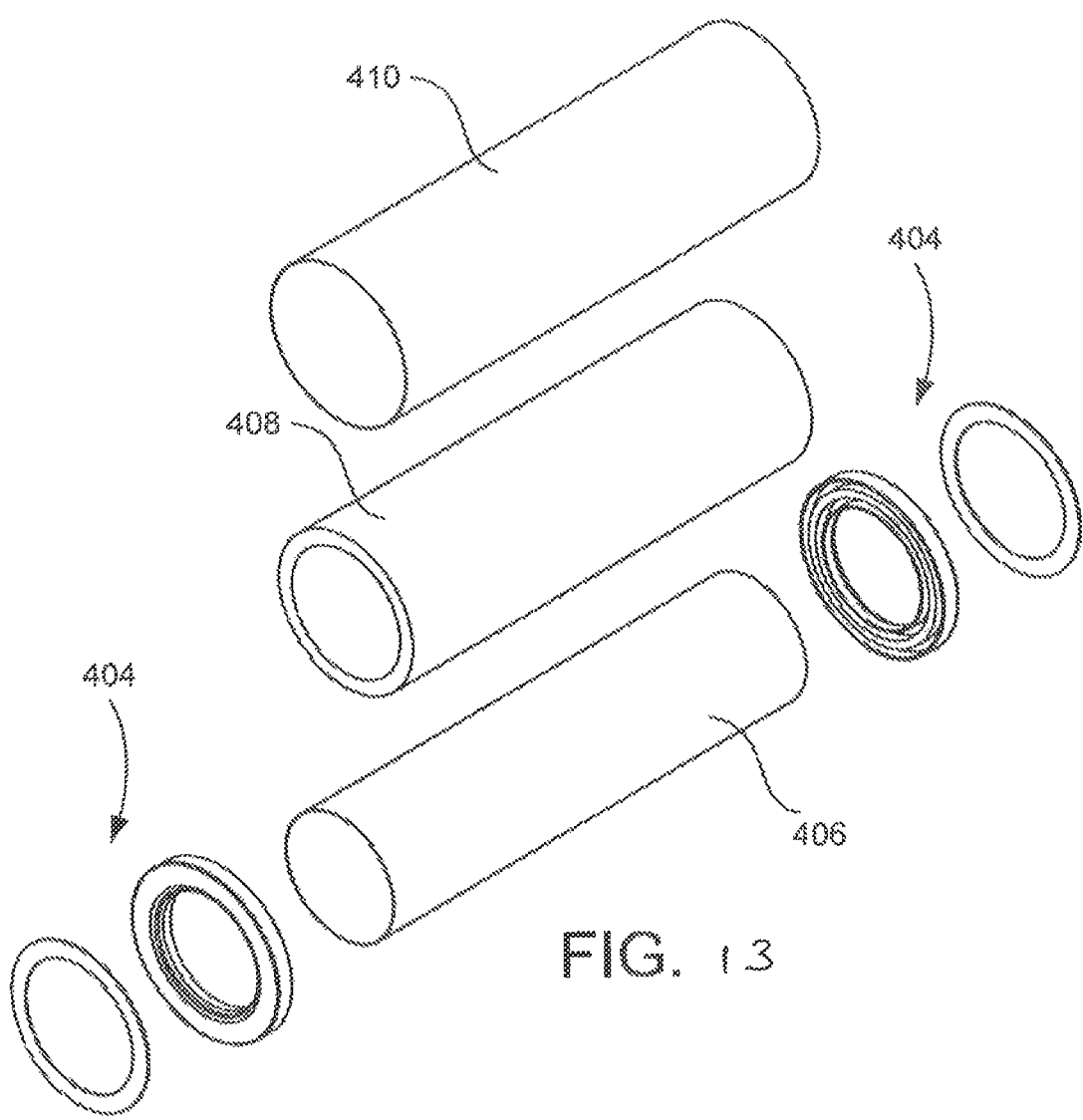
FIG. 13 is an exploded view of an ozone dampening module according to aspects of this disclosure.
Figure 14:
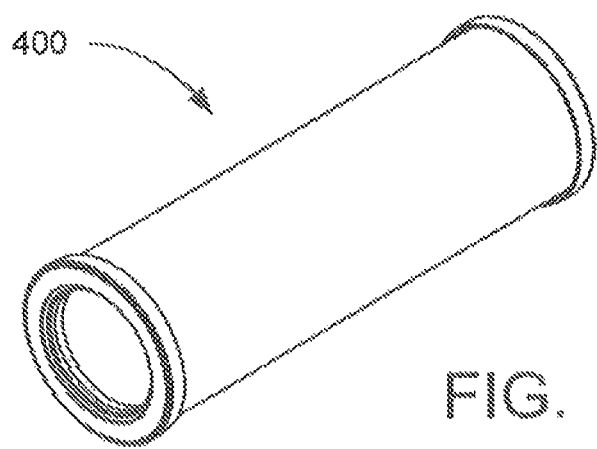
FIG. 14 is a perspective, side view of the assembled ozone dampening module of FIG. 13.
Figure 15:
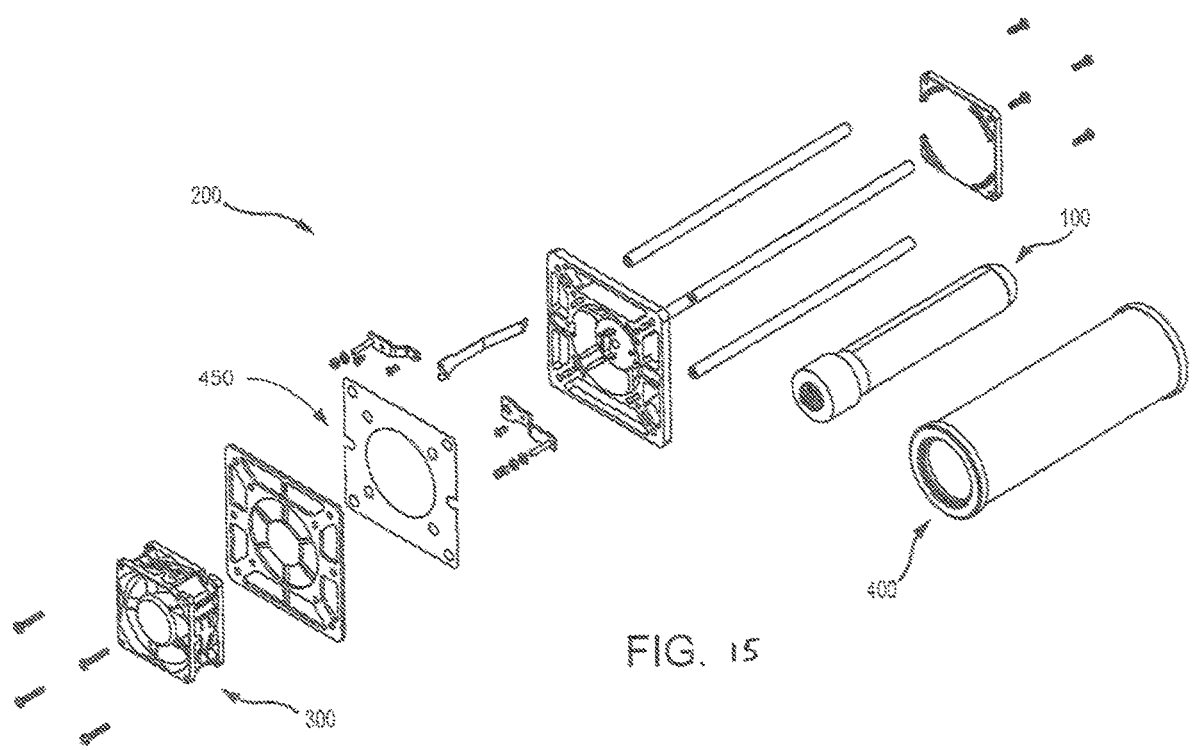
FIG. 15 is an exploded view of an ionization module according to aspects of this disclosure.
Figure 16:
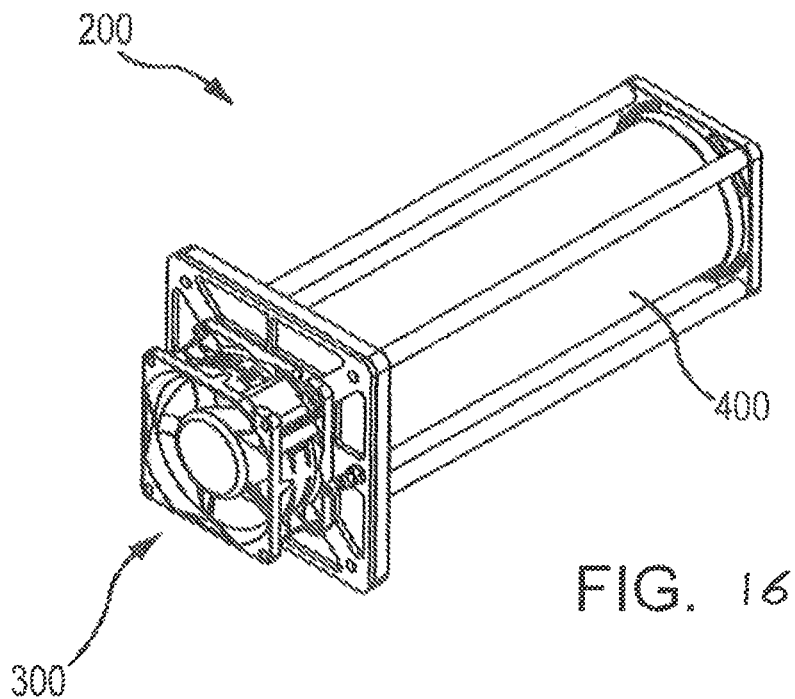
FIG. 16 is an assembled, perspective side view of the ionization module of FIG. 9.
Figure 17:
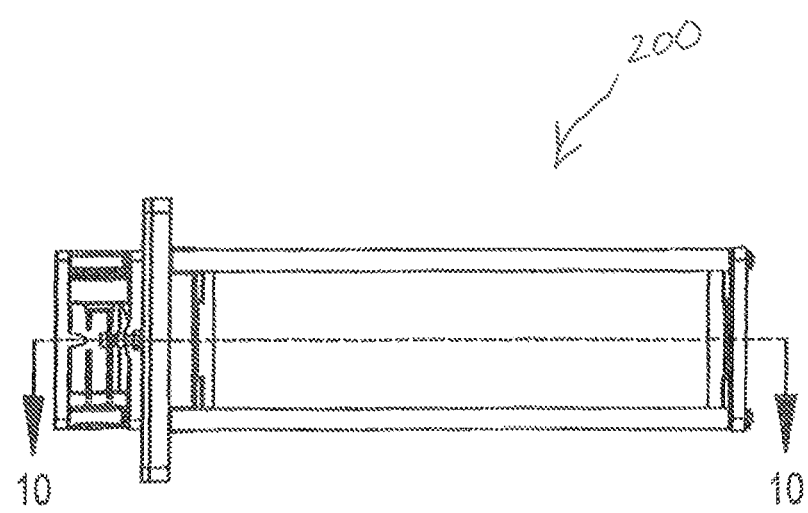
FIG. 17 is a side view of the ionization module of FIG. 16.
Figure 18:
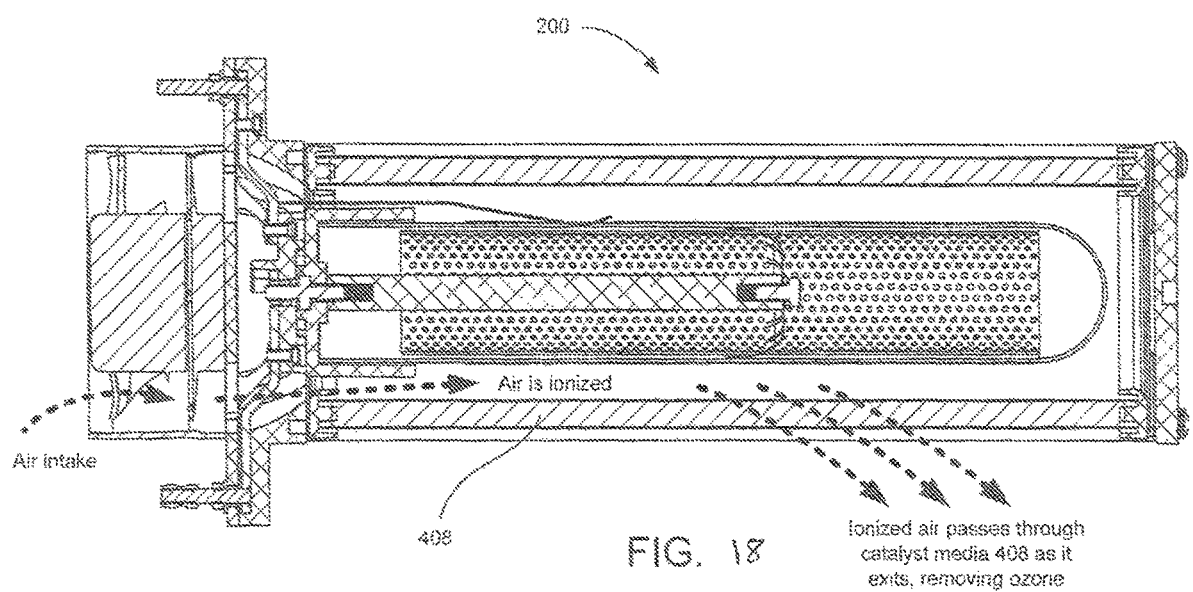
FIG. 18 is a cross-sectional, side view of the ionization module of FIG. 17 taken along lines A-A.
Figure 19:
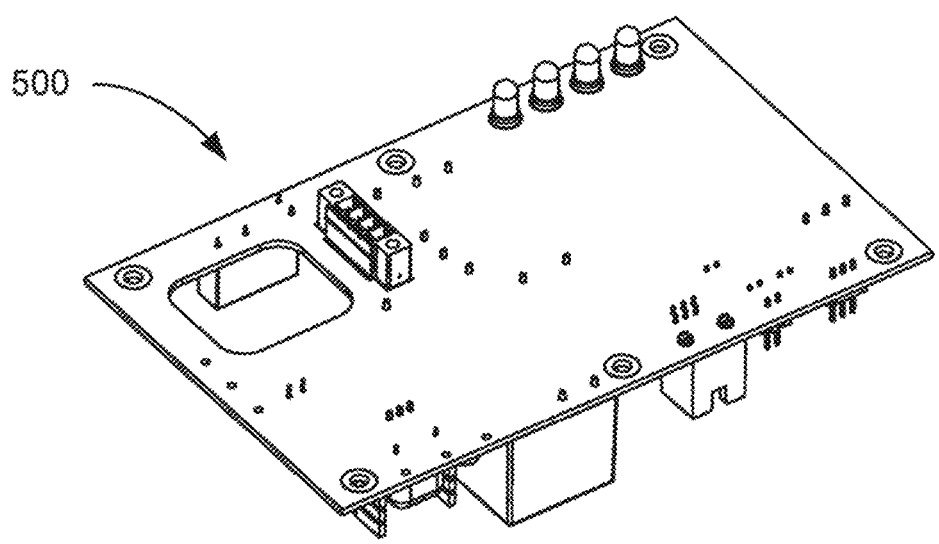
FIG. 19 is a bottom, perspective view of a control unit according to aspects of this disclosure.
Figure 20:
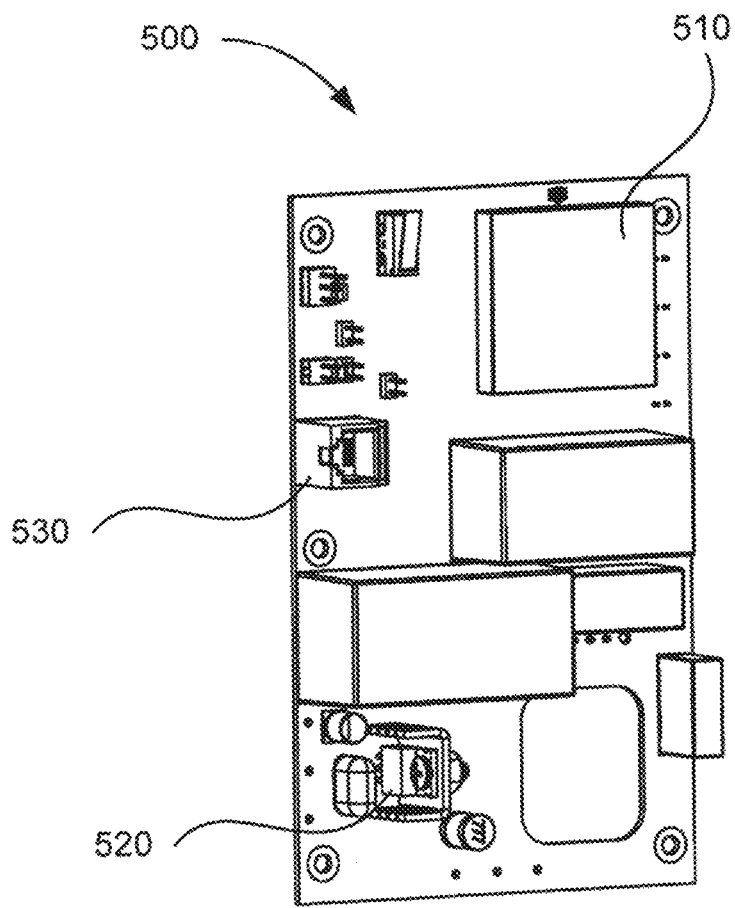
FIG. 20 is a top, perspective view of the control unit of FIG. 19.
Figure 23:
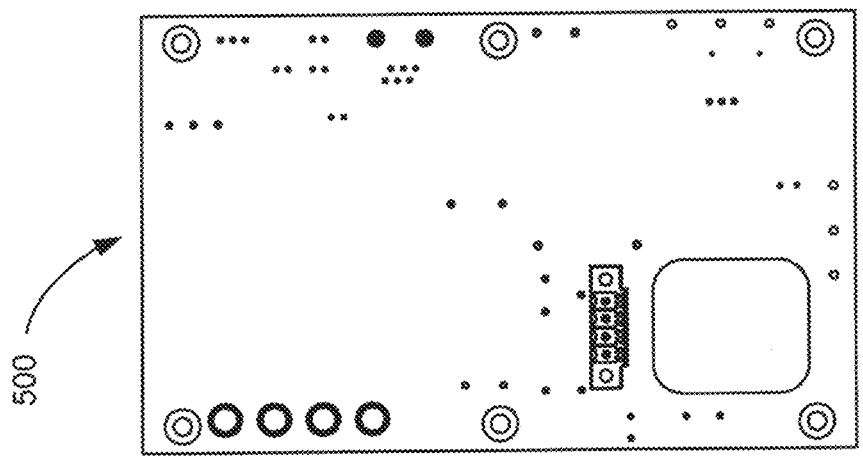
FIG. 23 is a bottom view of the control unit of FIG. 19.
Figure 22:
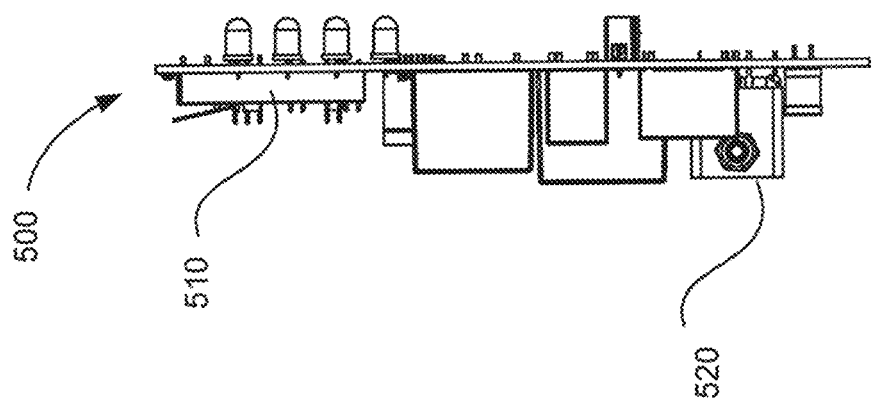
FIG. 22 is a side view of the control unit of FIG. 19.
Figure 21:
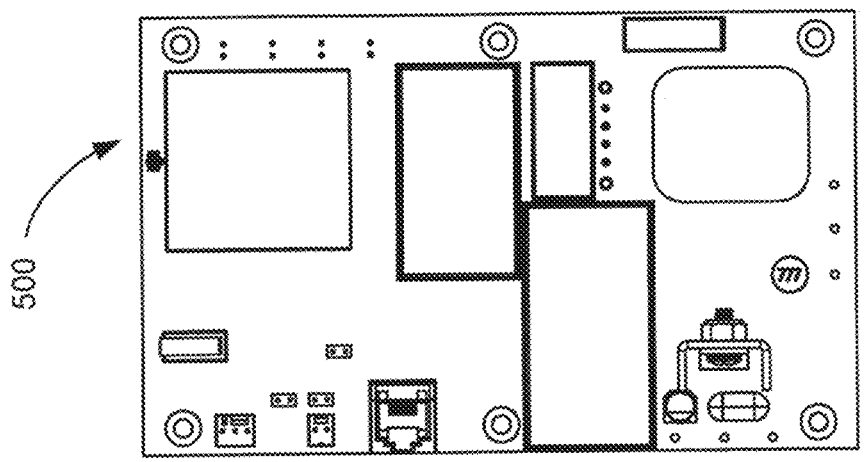
FIG. 21 is a top view of the control unit of FIG. 19.

With reference now to FIGS. 13 and 14, an ozone removal assembly 400 comprises a tubular inner wall 406, a tubular outer wall 410, and a pair of ends 404. Inner wall 406, outer wall 410, and ends 404 may be coupled together to form a container for a catalyst media 408. In an exemplary embodiment, inner wall 406 and outer wall 410 are coupled to a first end 404 (for example, via RTV silicone). First end 404 is disposed on a surface, and the space between inner wall 406 and outer wall 410 is filled with catalyst media 408. Second end 404 is then coupled to inner wall 406 and outer wall 410, securing catalyst media 408 in the resulting assembly. Inner wall 406 and outer wall 410 are configured to be at least partially permeable to air. For example, inner wall 406 and outer wall 410 may comprise rolled stainless steel mesh screen or the like.

In various exemplary embodiments, catalyst media 408 is configured to convert, neutralize, and/or otherwise remove and/or reduce an undesirable compound in the air, for example ozone, such as by converting ozone to oxygen. Catalyst media 408 may also be referred to as a "catalyst bed", "reaction bed", "ozone destruction catalyst", and/or the like. Catalyst media 408 may be granulated or otherwise shaped or formed to form part of ozone removal assembly 400. Catalyst media 408 typically comprises manganese dioxide, copper oxide, and/or the like, or combinations of the same. In some embodiments, catalyst media 408 comprises Carulite 200 offered by Cams Corporation (Peru, IL). However, any suitable catalyst configured to neutralize and/or remove ozone from an airstream may be utilized.

FIGS. 15 through 18 show an ionization and filter cartridge 200 according to a preferred embodiment of the invention. Cartridge 200 includes previously described module 100. It also generally includes a housing and support structure, a fan assembly (or fan) 300, an ozone removal assembly 400, and an air filter 450. Air filter 450 may comprise polypropylene, natural fibers, and/or the like. Air filter 450 is operative to reduce the amount of dust and other airborne particulates entering ozone removal assembly 400, as accumulation of dust on catalyst media 408 reduces its efficacy.

The support structure of cartridge 200 includes a section for supporting module 100 and ozone removal assembly 400, and a section for supporting fan assembly 300, wherein in the preferred embodiment, when cartridge 200 is fully assembled, it is a single unit that may be removed and replaced when desired.

Turning now to FIGS. 19 through 27, an exemplary ionization and filtration system 600 utilizes module 100 and cartridge 200. System 600 further comprises electronic controls 500. In various exemplary embodiments, electronic controls 500 are configured to control module 100 to generate an ionization level in excess of 66% negative ions; a negative ionization level significantly higher than previous systems. In this manner, module 100 generates a net excess of negative ions, and thus improved air filtration and clearing is achieved. In contrast, prior ionization systems typically generated approximately 50% positive ions and 50% negative ions, thus achieving limited efficacy as many ions quickly recombined and/or neutralized one another and were thus no longer available for air filtration and clearing. In some exemplary embodiments, electronic controls 500 pulse power convertors 520 in a manner suitable to positively bias power convertors 520 with respect to circuit ground; this results in generation of excess negative ions in module 100.

Additionally, electronic controls 500 may further comprise and/or communicate with various inputs (e.g., sensors) which monitor ionization levels, the density of particulates in the air, the ambient humidity, temperature, and/or the like. Based at least in part on the sensor inputs, electronic controls 500 adjust the operation of system 600 to achieve a desired level of filtration, ionization level, and/or the like.

With reference now to FIGS. 19 through 23, electronic controls 500 typically comprise various electronic components, for example: a printed circuit board; RF module 510 for wireless communication via a suitable wireless protocol or protocols (for example, IEEE 802.11 ("WiFi"), IEEE 802.15.4 ("ZigBee"), Bluetooth, GSM, and/or the like); power convertor(s) 520 for creating, modulating, transforming, and/or converting AC and/or DC current, for example for use in operating module 100 to produce ions; wired communication and/or input programming port(s) 530; together with various resistors, capacitors, inductors, transistors, diodes, light-emitting diodes, switches, traces, jumpers, fuses, amplifiers, antennas, and so forth as are known in the art. In various exemplary embodiments, electronic controls 500 further comprise a microprocessor and/or microcontroller (for example, an 8-bit or 16-bit microcontroller, such as the PIC16F1503T-I/SL microcontroller offered by MicroChip Corporation of Chandler, AZ). The microcontroller is operative for algorithmic (e.g., pre-programmed) operation, as well as responsive (e.g., pursuant to sensor inputs, communications, etc.) operation of system 600.

In one operating mode, electronic controls 500 are configured to operate module 100 at an 80% duty cycle (for example, 4 minutes in an ion generation mode, followed by one minute powered down, followed by 4 minutes in an ion generation mode, and so forth). In another operating mode, electronic controls 500 are configured to operate module 100 at a 100% duty cycle (always on). However, any suitable duty cycle may be utilized.

In various exemplary embodiments, electronic controls 500 are configured to generate up to 6000 volts at frequencies between 1 kHz and 2 kHz for use in ionization. Electronic controls 500 typically draw between about 700 milliamps and about 900 milliamps. Power supplied to module 100 via electronic controls 500 may be digitally managed, for example via a pulse width modulation (PWM) technique utilizing a fixed voltage and variable duty cycle. Moreover, operating parameters for electronic controls 500 may be remotely managed.

In various exemplary embodiments, electronic controls 500 employ a "white noise" mode wherein power convertors 520 are turned on and/or off via randomized timing. In this manner, transformer "whine" or "power line hum" may be reduced and/or eliminated, making the resulting system quieter and/or more suitable for inside use.

In yet another operating mode, electronic controls 500 are configured to operate system 600 in an "ozone depletion mode" whereby module 100 is powered down and does not create ionization, but air is still passed through catalyst media 408, for example responsive to operation of fan assembly 100 (and/or as a result of ambient airstream movement, for example in an HVAC duct). In this manner, system 600 is operative to remove ozone from the ambient air.

In various exemplary embodiments, electronic controls 500 monitor the performance of module 100 and/or ozone removal assembly 400, and may signal when a component of system 600 needs replacing (for example, due to deterioration of ionization components in module 100, due to dust accumulation on catalyst media 408 in module 400, and/or the like).

Electronic controls 500 are configured to monitor and control various operational characteristics of system 600, for example for safety. In various embodiments, electronic controls 500 monitor fan 300 speed and current draw, as well as module 100 voltage and current draw. System 600 may be shut down and/or restarted if an anomaly is detected. Additionally, electronic controls 500 may monitor status and error conditions, turn an ozone depletion mode on or off, monitor temperature limits for operation, and/or adjust a duty cycle associated with operation of module 100.

With reference now to FIGS. 24 through 27, system 600 may be configured to be installed in a ventilation duct, for example an existing HVAC duct of a building. System 600 may be installed in connection with a new build, or as a retrofit.

While various exemplary embodiments of system 600 may be discussed in the context of a residential HVAC installation, it will be appreciated that embodiments of the invention may be deployed in a wide variety of form factors, installation locations, and uses. For example, system 600 may be configured as: a desktop unit for placing on an office desk; a freestanding unit (for example, similar in form factor to a tower-style fan); a unit for installation in a vehicle such as an automobile, bus, or airplane; or a high-volume unit for use in connection with a hospital, school, food processing plant, restaurant, and/or the like. In particular, system 600 may desirably be utilized to sanitize and deodorize air that is exposed to or contains strong-smelling organic contaminants, reducing and/or eliminating undesirable odors.

Figure 28:
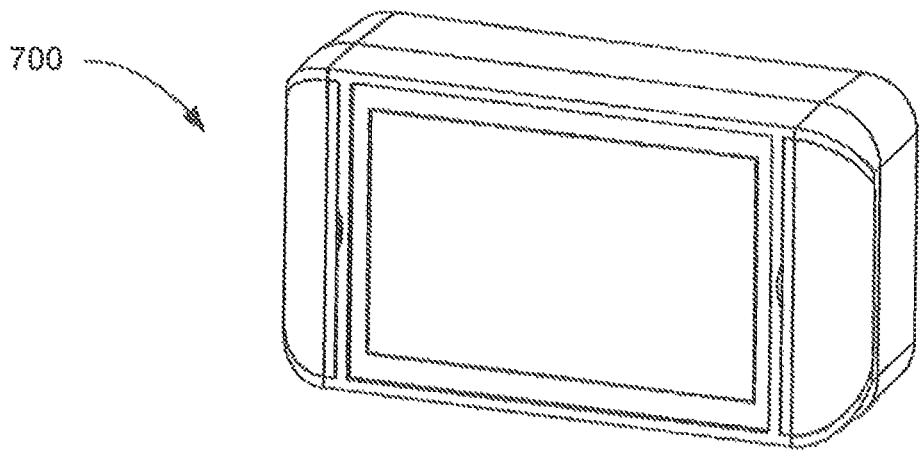
FIG. 28 is a front, perspective view of a display that may be used in accordance with aspects of the invention.

In some embodiments, with reference to FIG. 28 system 600 may further comprise a control panel 700. Control panel 700 comprises a display and various inputs, buttons, and the like. Control panel 700 is in wired and/or wireless communication with control electronics 500. Via control panel 700, a user may view statistics regarding operation of system 600, give commands to system 600, view error messages or other system 600 communications, and the like.

Alternate Module Configurations for Ionizing Air

Any of the alternative module configurations described herein may be used in systems or devices as previously described, or as described below. The alternative module configurations function in the same manner and have the same components as module 100, but they have different shapes, and/or different configurations, which makes them better suited for certain uses.

Figure 30:
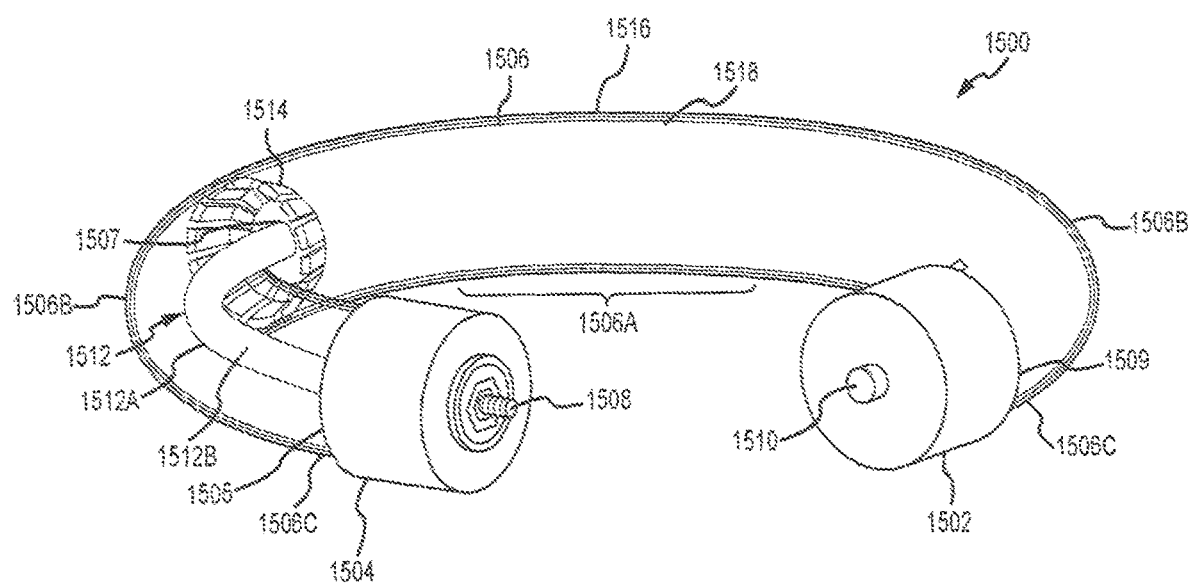
FIG. 30 is a front, perspective, partial cutaway view of a helical ionization tube that may be used with aspects of this disclosure.
Figure 30A:
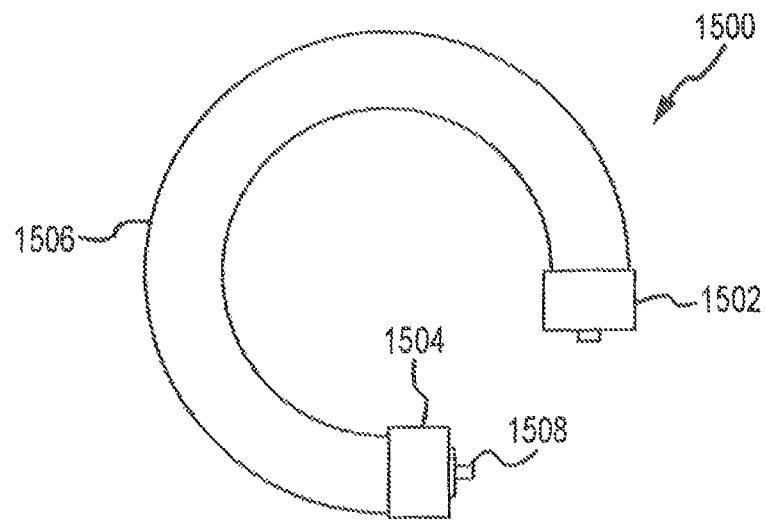
FIG. 30A is a top view of the tube shown in FIG. 30.
Figure 30B:
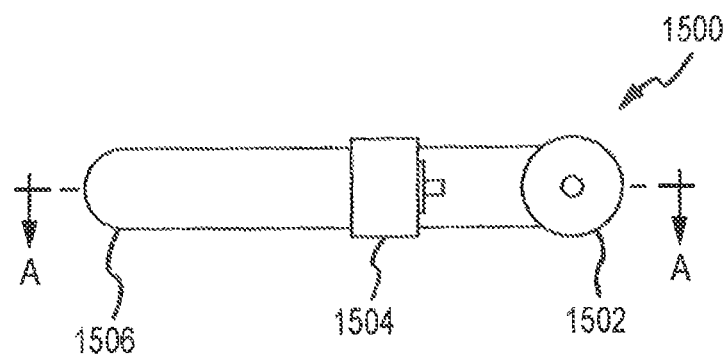
FIG. 30B is a side view of the tube shown in FIG. 30.
Figure 30C:
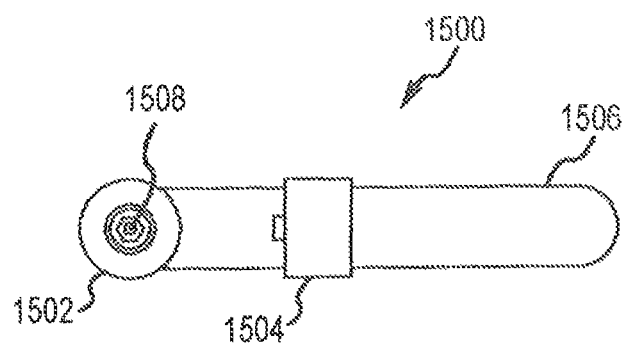
FIG. 30C is an alternative side view of the tube shown in FIG. 30.
Figure 30D:
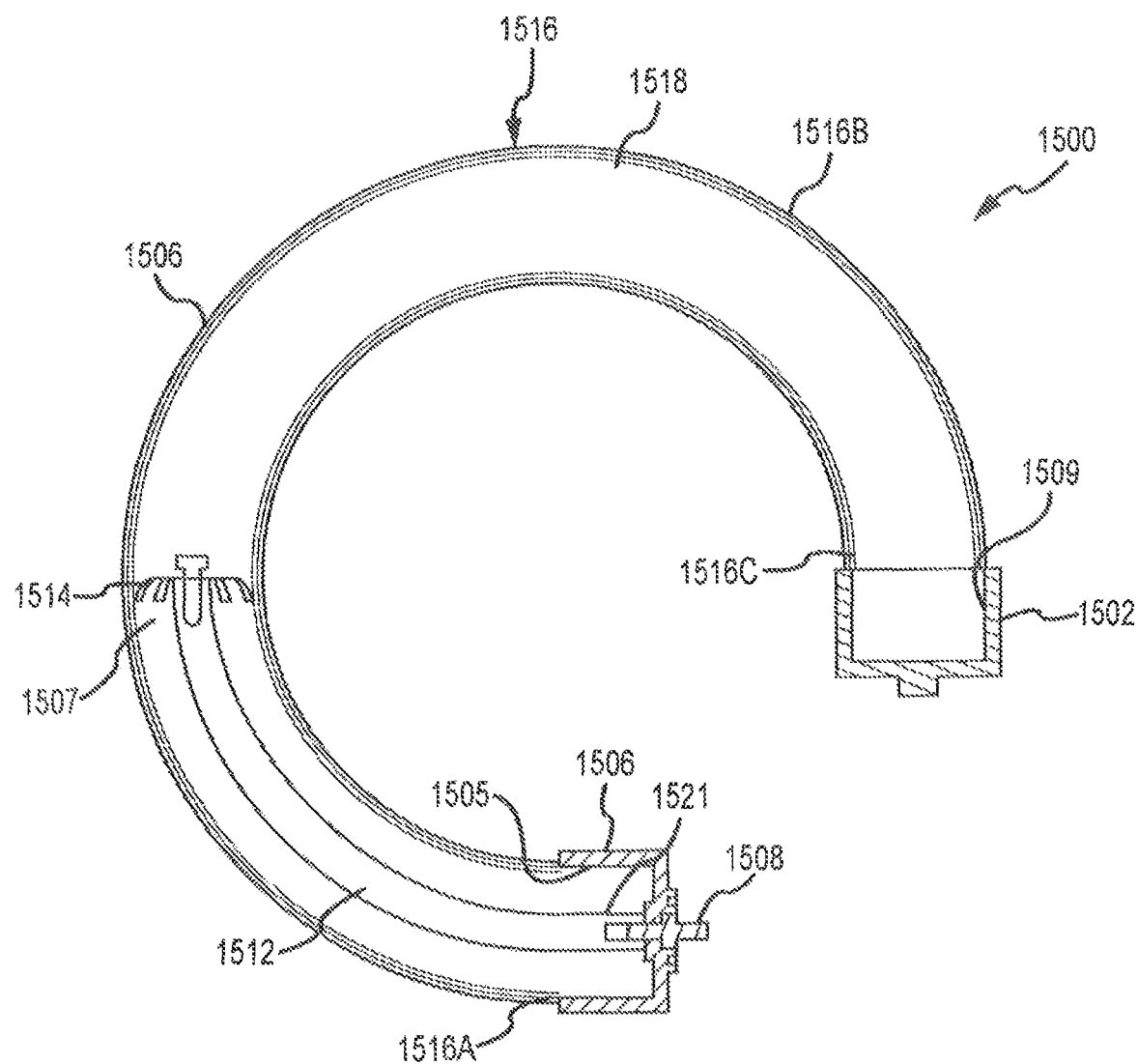
FIG. 30D is a cross-sectional, top view of the tube of FIG. 30B along line A-A.
Figure 30E:
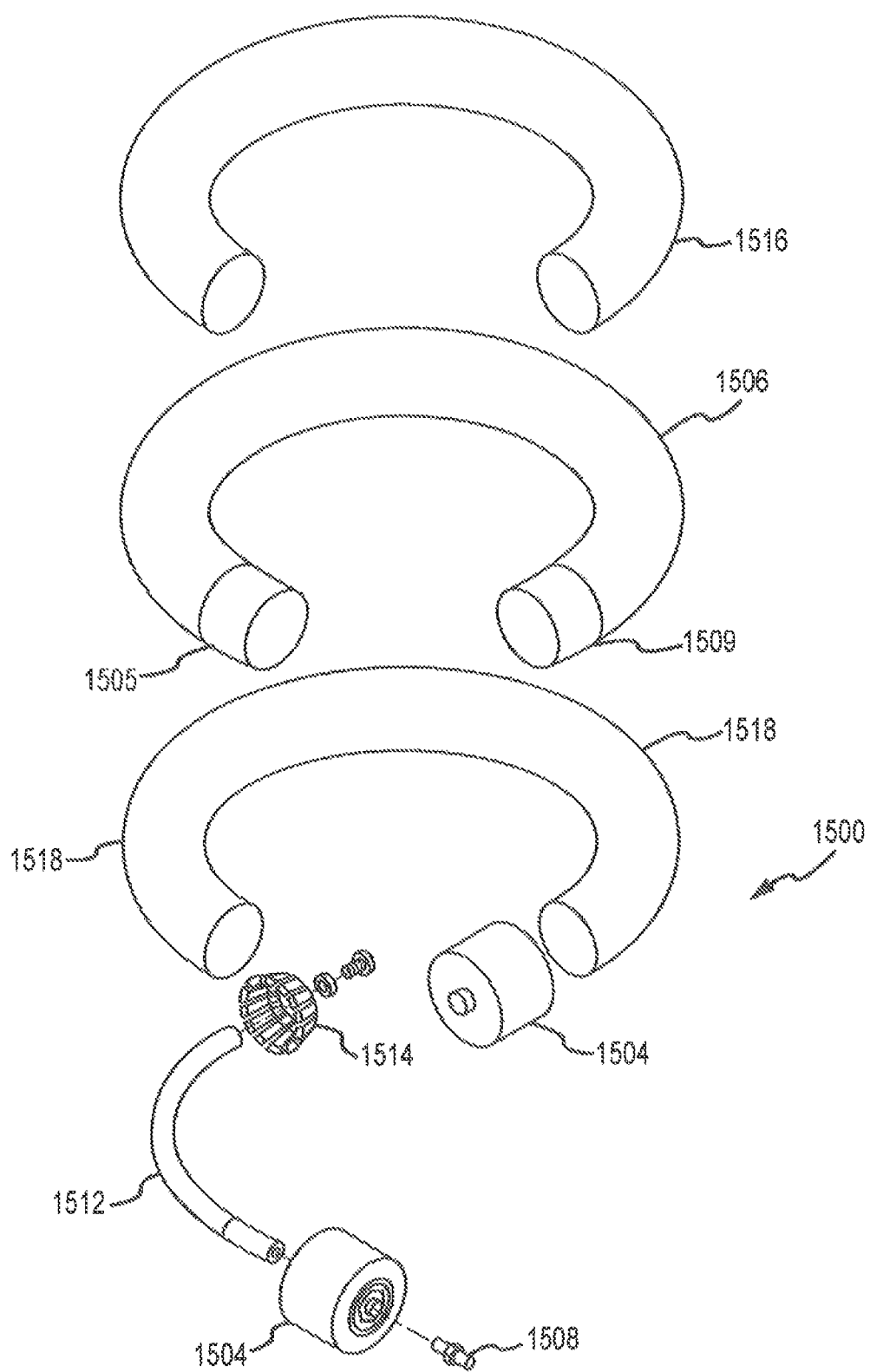
FIG. 30E is an exploded, front perspective view of the tube shown in FIG. 30.
Figure 30F:
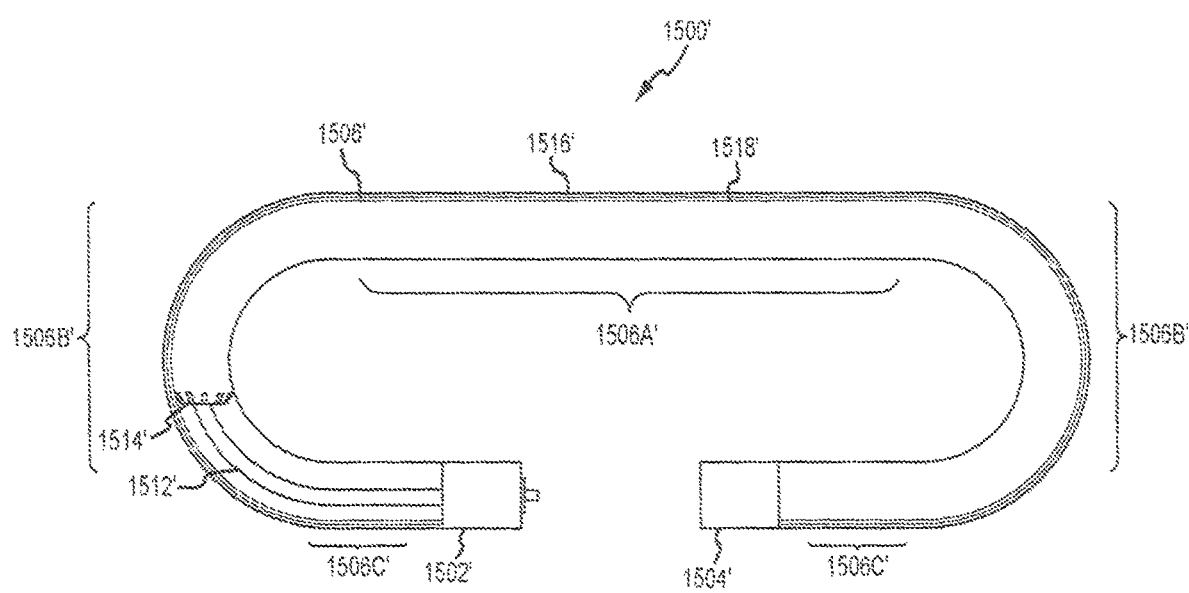
FIG. 30F is a top, partial cutaway view of an alternate example of an ionization tube that may be used with aspects of this disclosure.

FIGS. 30-30F shows a curved, or semicircular, module 1500. Module 1500 has the same components as module 100, except that some are shaped, and potentially sized, differently. Module 1500 has two end caps 1502 and 1504. Module 1500 has an adapter 1508 (which is the same as previously described adaptor 104), a curved coupler 1512 (which functions in the same manner as previously-described straight coupler 106), an ion dispenser 1514 (which functions in the same manner and has the same design and sub-structures as previously-described ion dispenser 108), a tube 1506 (which is formed of the same material and functions in the same manner as previously-described tube 110), an outer electrode 1516 and an inner electrode 1518 (which, other than their shape, are positioned, and function, respectively, in the same manner as previously-described outer electrode 112 and inner electrode 114).

End caps 1502, 1504 are preferably comprised of any suitable material, such as injection-molded ABS. Cap 1504 has the same structure as previously-described cap 102, and receives and supports coupler 1512, ion dispenser 1514, and tube 1506.

Coupler 1512 has a first end 1505, a second end 1507, an outer surface 1512A, and a passageway 1512B extending therethrough. In some embodiments, coupler 1512 comprises a hollow aluminum rod. Coupler 1512 may instead be a solid bar (which could comprise aluminum) with an internal threaded bore on each end to attach to other structures. Coupler 1512 may conduct electricity, and preferably does.

Adaptor 1508 as shown is a threaded shaft that passes through an opening (best seen in FIG. 30D) and is threadingly received in a passageway 1521, preferably in the same manner as threaded shaft 104 is attached to module 100.

An ion dispenser 1514 is attached to second end 1507 of coupler 1512. In an exemplary embodiment, ion dispenser 1514 may be configured with an umbrella-like shape, such as the shape of ion dispenser 108. However, ion dispenser 1514 may be configured with any suitable shape, as desired. Ion dispenser 1514 operates to dispense electricity to inner electrode 1518. Ion dispenser 1514 as shown in this preferred embodiment is comprised of stainless steel (for example, stainless steel having a thickness of between about 0.006 inches and about 0.015 inches), and preferably has the same structures and materials as previously-described ion dispenser 108, and is attached to coupler 1512 in the same manner as ion dispenser 108 is attached to coupler 106.

Inner electrode 1518 typically comprises a rolled perforated aluminum sheet, but may comprise any suitable material or combination of materials configured to act as a first electrode for purposes of ionization.

Outer electrode 1516 typically comprises a tubular stainless steel wire mesh, for example a 0.008 in diameter Type 316 stainless steel wire mesh configured with a 20×20 per square inch grid. However, outer electrode 1516 may comprise any suitable material or combination of materials configured to act as a second electrode for purposes of ionization.

A tube 1506 is preferably glass (for example, comprised of borosilicate) and retains coupler 1512, and ion dispenser 1514, and inner electrode 1518. Tube 1506 is also operative to insulate inner electrode 1518 from outer electrode 1516 and thus permit the development of a voltage potential therebetween in order to facilitate ionization. Tube 1506 has a first, open end 1505, a second, open end 1509, and an outer surface. Preferably, after cap 1504, coupler 1512, and ion dispenser 1514 are assembled, inner electrode 1518 is placed within tube 1506, the first end 1505 of tube 1506 is positioned over ion dispenser 1514 and coupler 1512, and is received in cap 1504 in a snug to slightly loose fit.

Outer electrode 1516, which has a first end 1516A, an outer surface 1516B, a second end 1516C, and an inner passage into which tube 1506 is received, is positioned over tube 1506. In the preferred embodiment shown, outer electrode 1516 does not cover second end 1509 of tube 1506 or extend to cap 1504.

In the preferred embodiment, when module 1500 is assembled, coupler 1512 and ion dispenser 1514 are positioned approximately 30-50% inside of tube 1506, although any suitable percentage is acceptable. In this manner, electrical current is delivered to the inside of, and approximately the center of, inner electrode 1518.

Ion dispenser 1514 is preferably connected to a second end 1507 of coupler 1512 and functions in the same manner, and is preferably formed of the same material, as ion dispenser 108.

Module 1500 is curved and to accommodate this curved shape, tube 1506, coupler 1512, inner electrode 1518 and outer electrode 1516 are suitably curved. Module 1500 includes a first end sleeve 1502, a second end sleeve 1504 and a curved body portion 1506. A connector 1508 is configured to connect to a power source (not shown). End sleeve 1502 (previously described) has a fastener 1510, which has the same structure and is utilized with the same components as fastener 113.

The coupler 1512, which functions in the same manner as coupler 106, is configured so it has a curve that approximates or is equal to the curve of tube 1506, so that coupler 1512 is approximately centered, or centered, in curved tube 1506.

Ionization module 1500 may be in the shape of a continuous curve, or be straight along the central portion 1506A and have curves at side portions 1506B, as shown in FIG. 27F. Further, ends 1506C of tube 1506 may be straight or curved. If curved, end sleeves 1502 and 1504 are configured in a shape to fit on curved ends 1505 and 1509.

FIG. 30A shows a top view of ionization module 1500. FIG. 30B shows a side view of ionization module 1500. FIG. 30C is an alternate side view of ionization module 1500. FIG. 30D is a cross-sectional top view of module 1500 taken across line A-A of FIG. 30B. FIG. 30E is an exploded view of ionization module 1500. Not shown in FIGS. 30-30F is an ozone removal assembly, which is the same type of assembly as previously-described assembly 400 except that it would be shaped to fit at least partially over ionization module 1500 or 1500' and allow a space therebetween for air to pass through. Alternatively, as described below, the ozone dampening catalyst could be in a filter of any shape or size wherein the ionized air passes through the ozone dampening catalyst after it is ionized by the ionization module.

Figure 24:
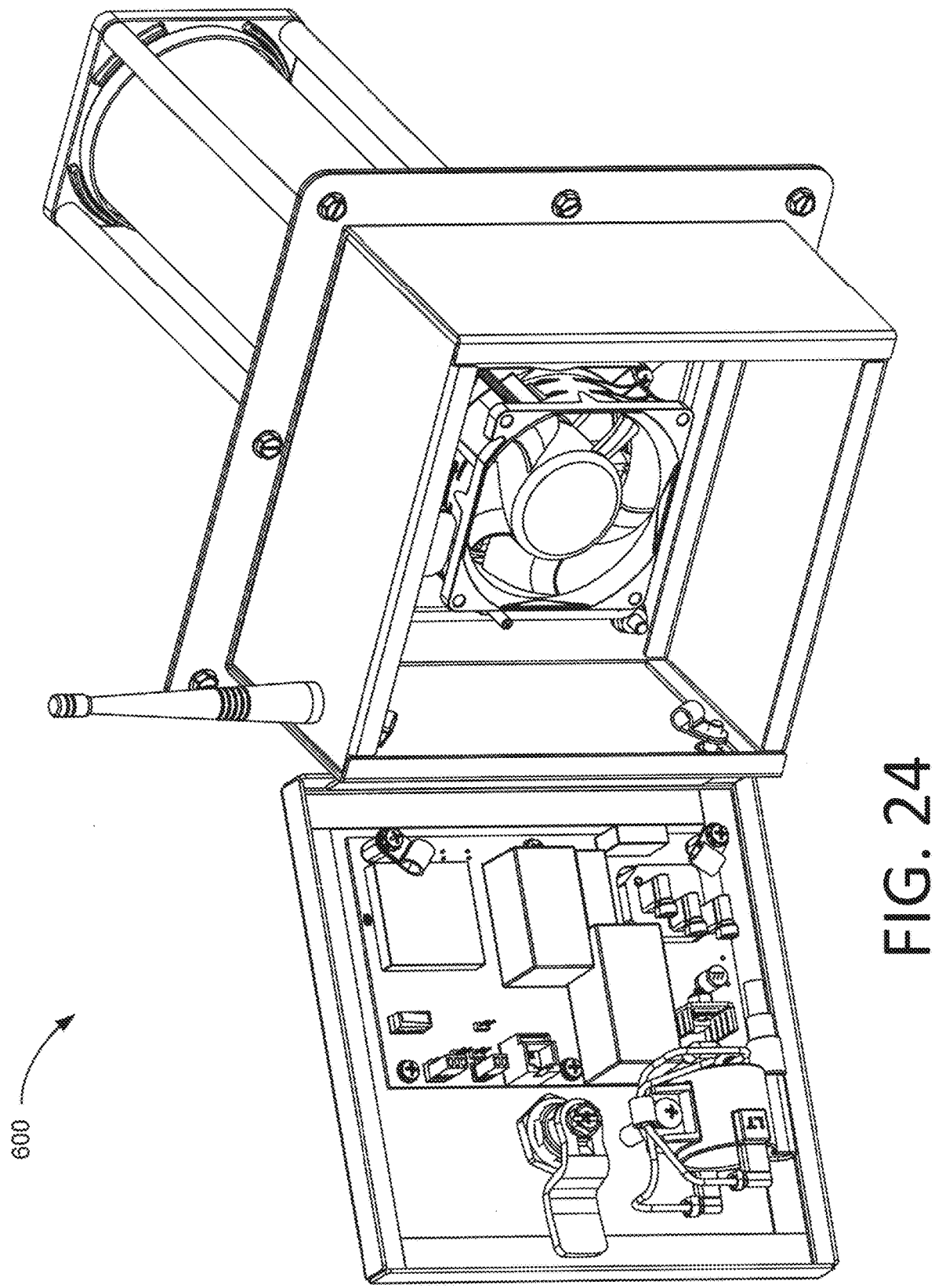
FIG. 24 is a perspective, side view of an ionization system in accordance with aspects of this disclosure with the housing opened.
Figure 25:
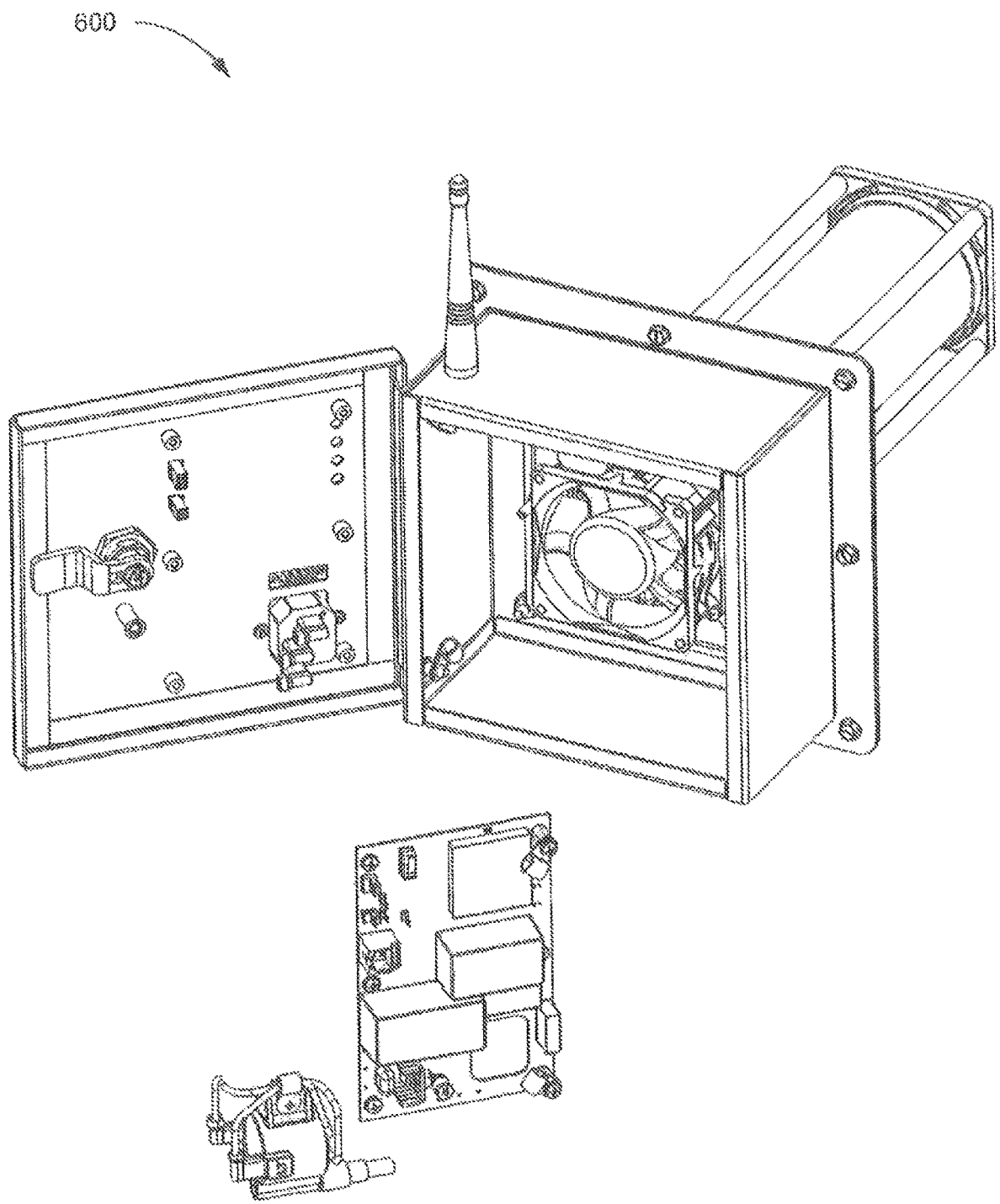
FIG. 25 is a perspective, side view of the ionization system according to FIG. 24 with the control unit and energy converter removed.
Figure 26:
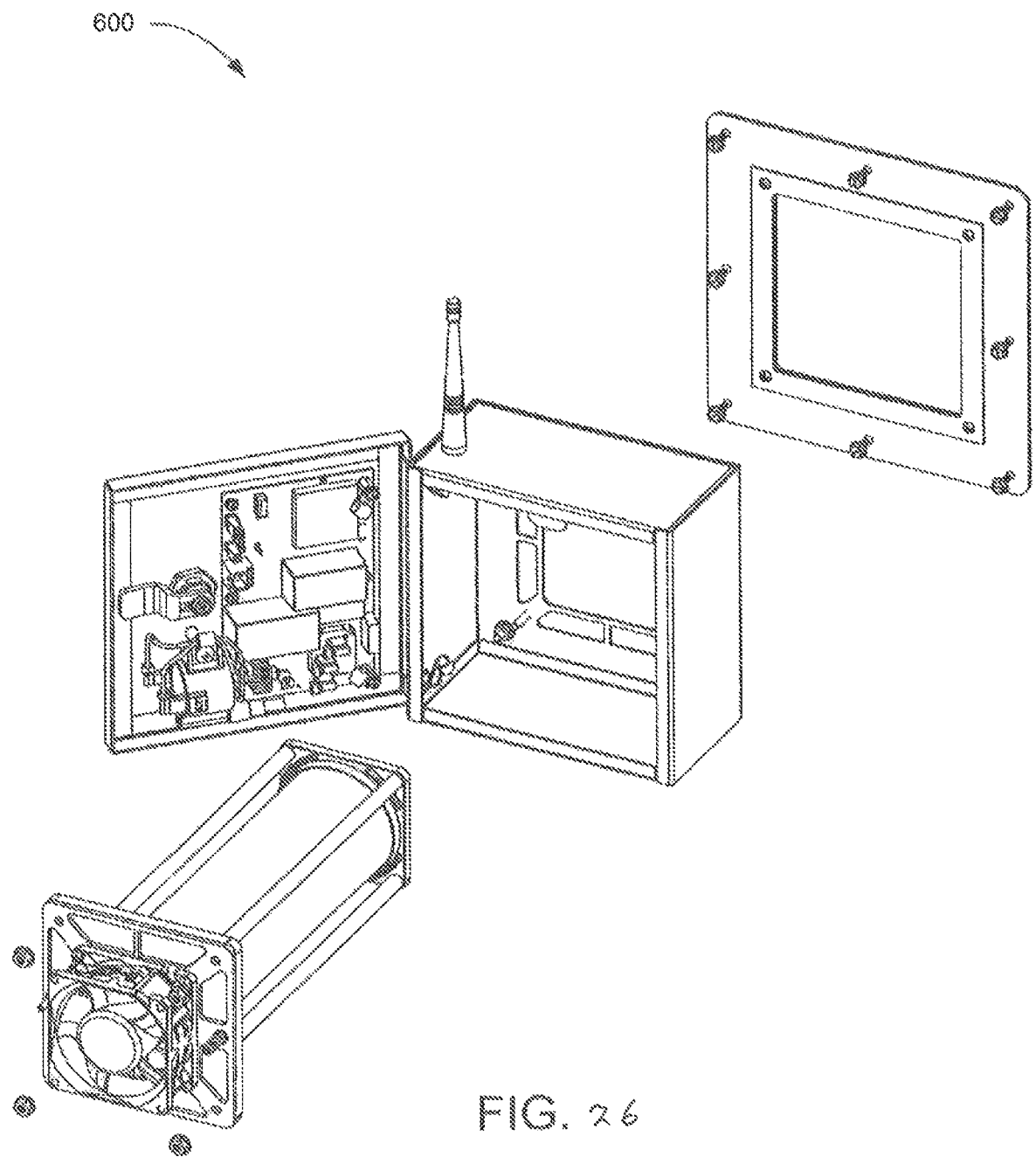
FIG. 26 is a partial exploded, front view of the ionization system of FIG. 24 showing the ionization module removed from the housing, and the housing removed from a support plate.
Figure 27:
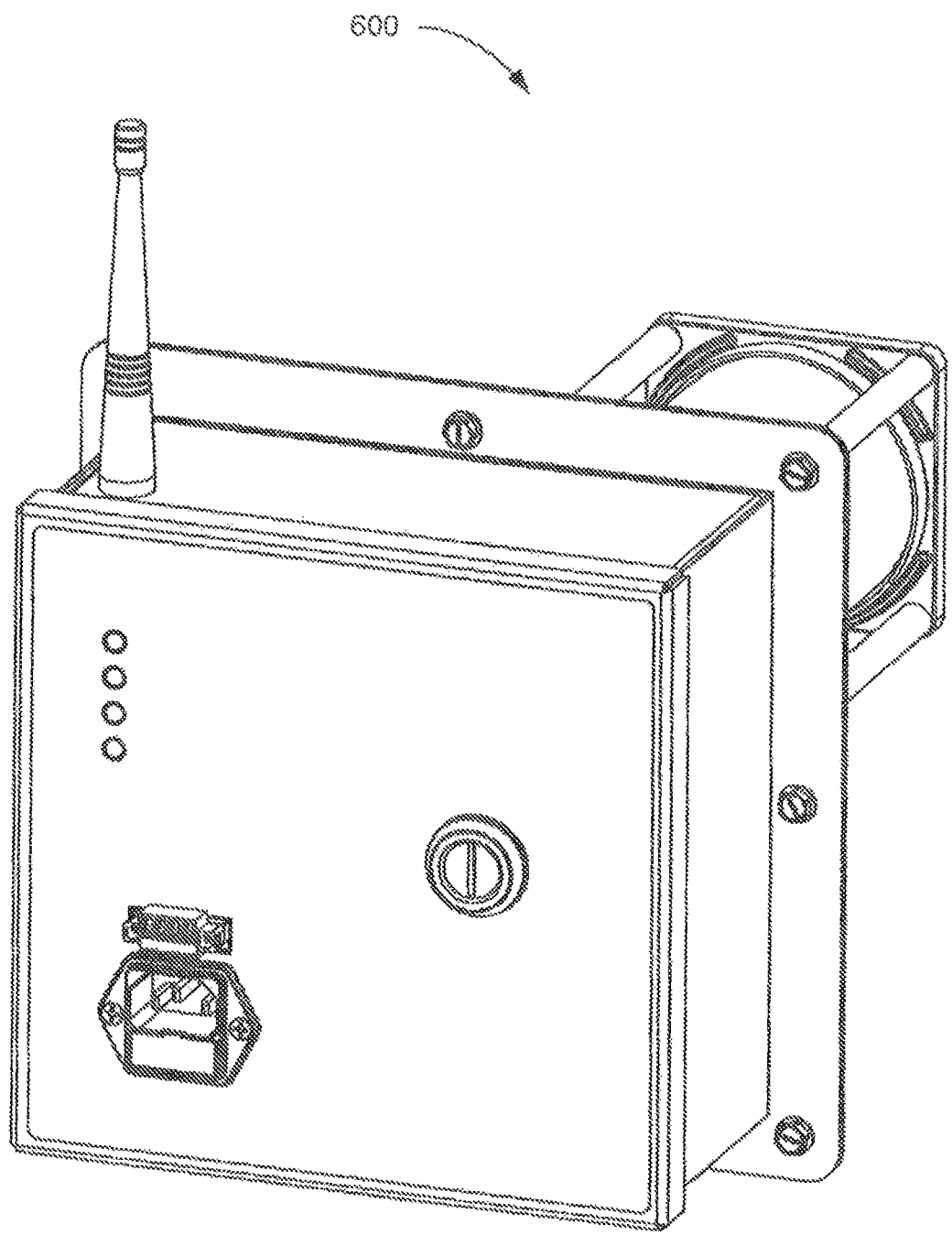
FIG. 27 is a front, perspective view of an ionization system according to this disclosure.

A tube 1500' with a straight section 1506A, curved side sections 1506B', and end sections 1506C' is shown in FIG. 24F. Coupler 1512' is configured to fit in tube 1506' so it is approximately centered or centered inside of tube 1506'. Ion dispenser 1514' is the same as ion dispenser 1514 shown in FIG. 24, which is the same as ion dispenser 108. End caps 1502', 1504' are configured to fit on straight end sections 1506C' of tube 1506'.

An advantage of making an ionization tube in one of these shapes is that tube 1500 or 1500' can have the same total area for ionization as for a straight tube, it can fit inside a smaller, or differently-sized, structure or space. Alternatively, it can provide a greater ionization area within the same space.

Figure 31A:
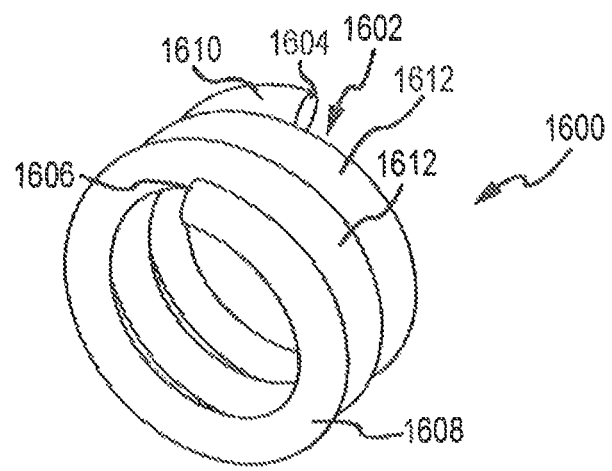
FIGS. 31A-31C show side perspective views of alternate helical tubes that may be used with aspects of this disclosure.

FIG. 31A shows a helical, multi-twist tube 1600 with a constant diameter. Tube 1600 has a body 1602 that includes an end 1604, an end 1606, two full coils 1612, and two partial coils 1608 and 1610. End caps (not shown), internal ionization structures (not shown), inner and outer electrodes (not shown), and an ozone removal assembly (not shown), are configured and sized to function with tube 1600 in the same preferred manner as described herein. As an example, the coupler and ion dispenser may be inserted through end 1604 or 1606, and may be positioned in up to 20%-60% of the length (as measured annularly) of tube 1600.

Figure 31B:
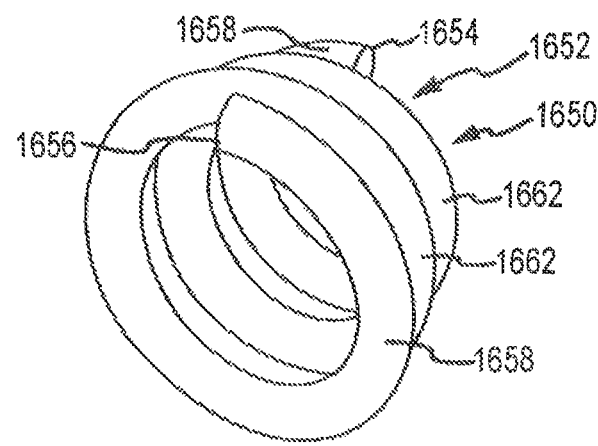

FIG. 31B shows a helical, multi-twist tube 1650 with a decreasing diameter moving from end 1656 to end 1654, which is also referred to herein as an inward helical shape. Tube 1650 has a body 1652 that includes an end 1654, an end 1656, two full coils 1662, and two partial coils 1658 and 1660. End caps (not shown), internal ionization structures (not shown), inner and outer electrodes (not shown), and an ozone removal assembly (not shown), are configured and sized to function with tube 1680 in the same manner as described herein, although these components would be configured to fit on or in tube 1650, or to otherwise function with tube 1650. As an example, the coupler and ion dispenser may be inserted through end 1654 or end 1656 and may be positioned in up to 20%-60% of the length (as measured annularly) of tube 1650.

Figure 31C:
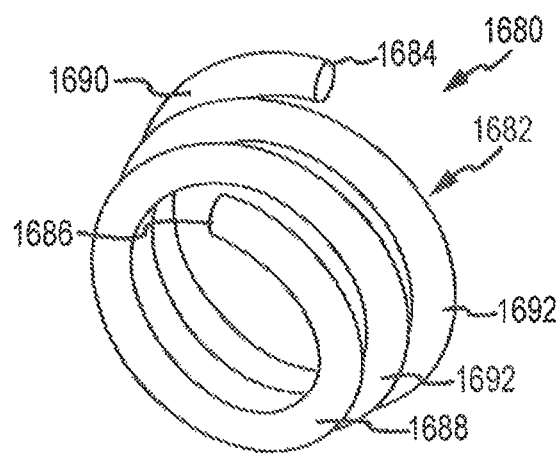

FIG. 31C shows a helical, multi-twist tube 1680 with an increasing diameter moving from end 1686 to end 1684, which is also referred to herein as an outward helical shape. Tube 1680 has a body 1682 that includes an end 1684, an end 1686, two full coils 1692, and two partial coils 1688 and 1690. End caps (not shown), internal ionization structures (not shown), inner and outer electrodes (not shown), and an ozone removal assembly (not shown), are configured and sized to function with tube 1680 in the same manner as described herein, although these components are configured to fit on or in tube 1680, or to otherwise function with tube 1680.

Figure 29:
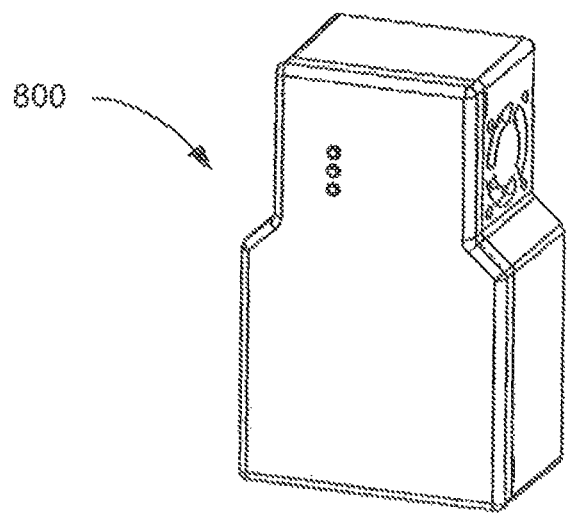
FIG. 29 is a side, perspective view of a sensor that may be used in accordance with aspects of this disclosure.

An inside sensor system is depicted in FIG. 29, wherein system 600 may further comprise one or more remote sensors 800. Remote sensor 800 is in wired and/or wireless communication with control electronics 500. Remote sensor 800 may comprise various sensors, for example a temperature sensor, particulate sensor, ozone sensor, carbon monoxide sensor, humidity sensor, and/or the like. Responsive to information received from remote sensor 800, control electronics 500 may modify operation of system 600, for example turning module 100 on or off, turning fan 300 on or off, and/or the like. For example, when remote sensor 800 reports ambient ozone above a target threshold, control electronics 500 may operate system 600 in an ozone depletion mode for a period of time until ambient ozone is below a target threshold. Likewise, when remote sensor 800 reports that particulates are above a target threshold, control electronics 500 may increase the duty cycle of module 100 in order to generate increased ionization and thus increase the rate of particulate removal. Remote sensor 800 may be battery powered, or may be configured to be plugged into a power outlet. Multiple sensors 800 may be utilized to provide information regarding an operational environment to control electronics 500.

Operating parameters for system 600 may be monitored and changed remotely, for example via wireless communication. Changes for system 600 may be supplied via a connected software application operable on a tablet or smartphone, via control panel 700, via a universal serial bus connection to control electronics 500, and/or the like.

Figure 32:
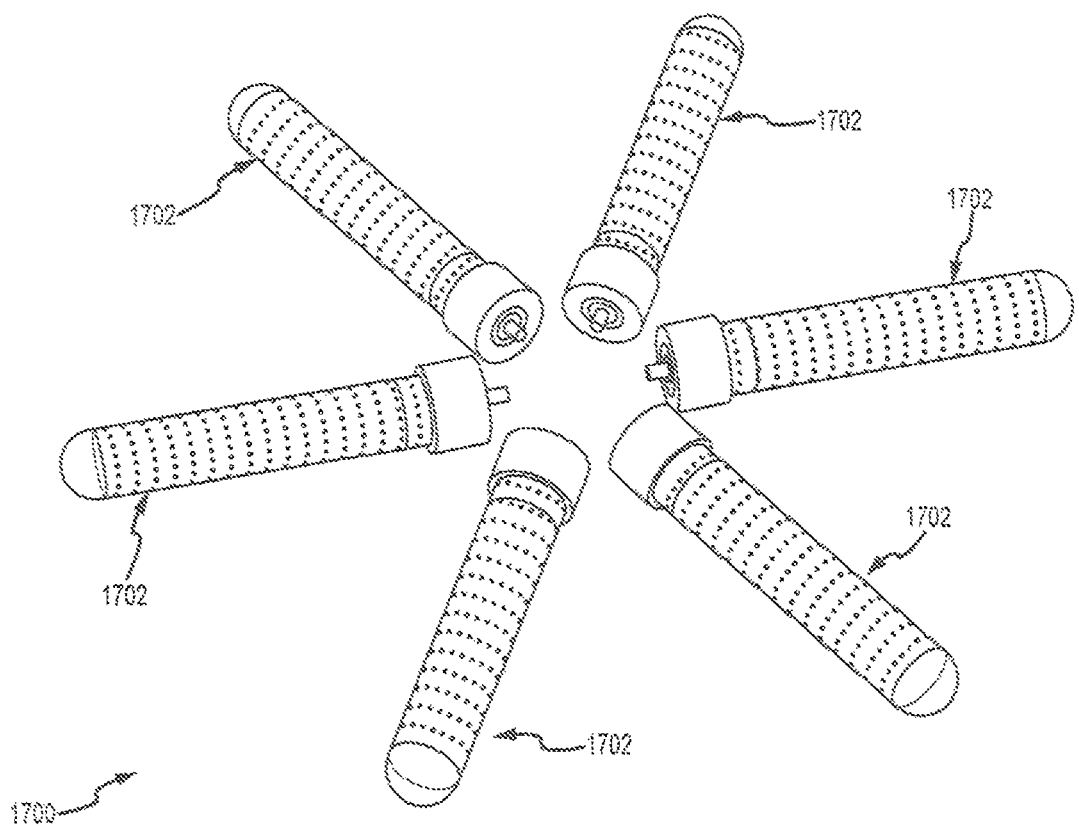
FIG. 32 is a top, perspective view of an array of ionization tubes that may be used with aspects of this disclosure.

FIG. 32 shows a rotary configuration 1700 of multiple (or a plurality of) straight ionization modules 1702. Each module 1702 has any suitable structure, such as the preferred structure of previously-described module 110, with ion dispenser 108, inner electrode 114, coupler 106, outer electrode 112, cap 102, and ozone removal assembly 400. Although six tubes 702 are shown, any plurality of tubes, such as between three and eight tubes, can be arranged in a rotary configuration. An advantage of this configuration is that a greater overall tube surface area, and hence ionization area, is provided in a given space. In addition, each individual tube could have a length and/or diameter that is less than that of a standard ionization tube. For example, each tube may have a length of anywhere between 4" and 12"; or up to 4", 5", 6", 7", 8", 9", 10", 11", or 12"; or a length greater than 12". Each tube may also have an inner diameter of anywhere between ¼" to 1½"; or up to ¼", ½", ¾", 1", 1¼", 1½", 1¾", 2", 2¼", or 2½"; or greater than 2½". Additionally, tubes used in configuration 1700 may have differing lengths and inner diameters.

Additionally, the ozone removal assemblies 400 on each tube 1702 could instead, or in addition to, be an ozone removal filter (such as filter 1780, described below), which could be below, above or beside tubes 1702, or that is otherwise downstream of the tubes 1702 according to the direction of the flow of air being ionized.

Supply Air Vent

Figure 33:
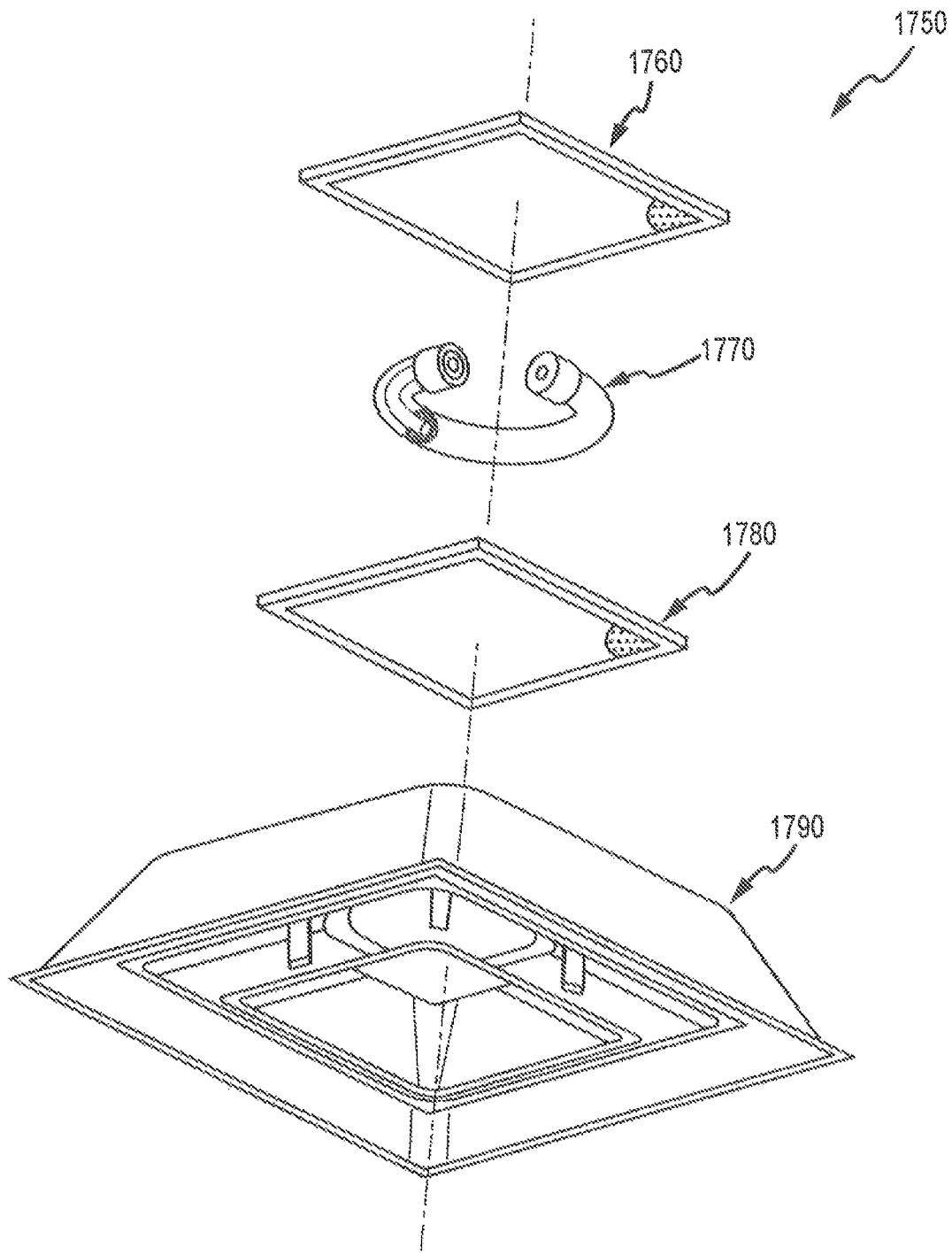
FIG. 33 is a bottom, perspective, exploded, partial cutaway view of an air supply vent utilizing an ionization system according to aspects of this disclosure.

FIG. 33 shows a supply air vent 1750 with an integral air ionization system. As shown, supply air vent 1750 has (1) a clean air filter 1760 (which is optional and need not be used); (2) an ionization module 1770, which as shown is a curved ionization unit, such as previously-described module 1500, but could be any suitable ionization module, such as module 1600, 1650, or 1680, or a single, straight module 110, or a plurality of straight modules 1702 in a rotary configuration as shown in FIG. 29, or a plurality of straight tubes placed side to side or in any suitable position; (3) an ozone removal filter 1780 beneath ionization unit 1770; and (4) vent frame 1790, which is configured to retain structures 1760, 1770, and 1780 and be mounted in an air supply vent. The ozone removal filter is shown as being flat, but it preferably has the same structure as defined for ozone removal assembly 400 and includes catalyst media 408, as previously described.

An optional fan (not shown) may be positioned between the clean air filter 1760 and ionization unit 1770, or above clean air filter 1760, or if there is no clear air filter 1760, above the ionization module 1770. If used, the fan is positioned and configured to push air past ionization unit 1770 and through ozone removal filter 1780, which is the normal flow of air through the air supply vent cover 1750 into a living or working space.

Airflow Sensors

Figure 34:
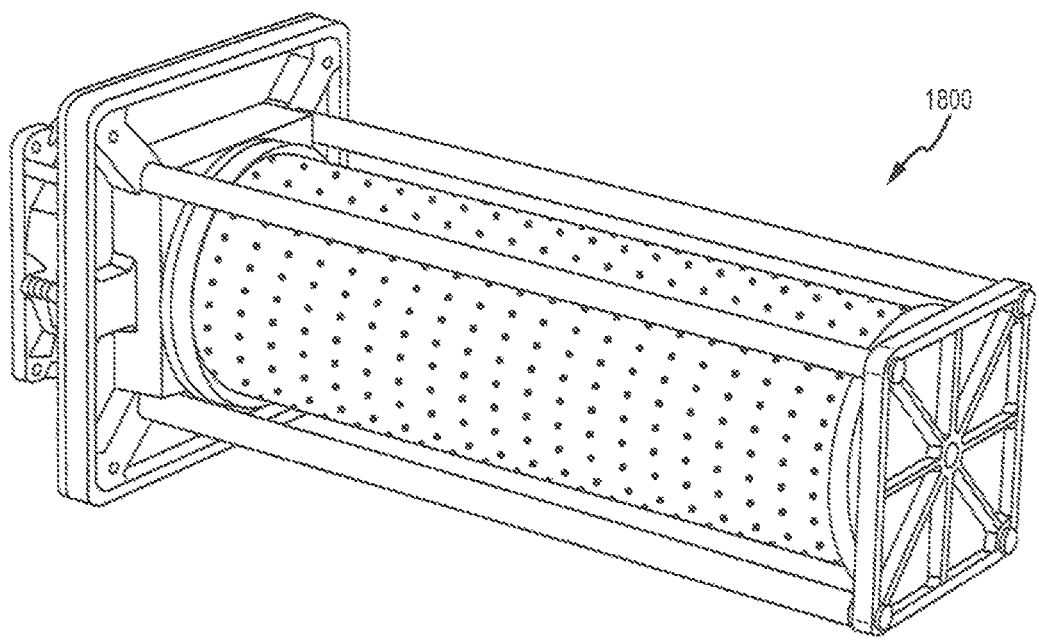
FIG. 34 is a side, perspective view of an intelligent filter monitoring system and device according to aspects of the invention.

FIG. 34 shows an ionization module 1800, which is the same as removable module 100 previously described. Module 1800, however, includes airflow sensors, which are known in the art, that detect the flow of air into the space between the ionization tube and the ozone filter. Based on the difference between the air flow rate at the time module 1800 is first installed and a current air flow rate, the air flow sensor can signal the controller and the controller can initiate an alert that the clean air filter (or preferably the entire ionization module 1800 should be changed). The alert could be noise, such as a "beep" recurring at set time intervals (such as any interval between five minutes and one hour. Or, the alert may be a continuous or flashing light signal or display of the control panel, such as lighted words that read "change filter," or "change ionization module." Accordingly, the controller must be programmed to include in it an air-flow rate that indicates replacement of an air filter, or assembly including and air filter, is required. This air-flow rate is determined by one or more of several factors for a given environment: (1) whether smokers are present and how much they smoke, (2) where the filter is located, such as in the kitchen (where there are many contaminants, or in a remote bedroom that's seldom used, (3) whether there are pets in the building and where the pets are located, (4) the number of occupants in the building, (5) activities in the building that would create particulates, and (6) the type of HVAC system used. In other words, instead of changing air filters based on a set period of time, the variables above would be entered into the controller and the controller would create an alert to change a filter when the air-flow rate is at a predetermined level that indicates the filter should be changed.

A filter such as filter 1760 or 1780 could also have associated air-flow sensors located at any suitable position (such as one or more at or near the center of the filter, plus additionally others on one or more sides and corners of the air filter) to detect when clean air filter 1760 or ozone removal filter 1780 should be changed. Such air-flow sensors, when they detect the air-flow through a filter is at too low a rate, could signal the controller, which could create an alert, preferably in one of the ways previously described.

Figure 35:
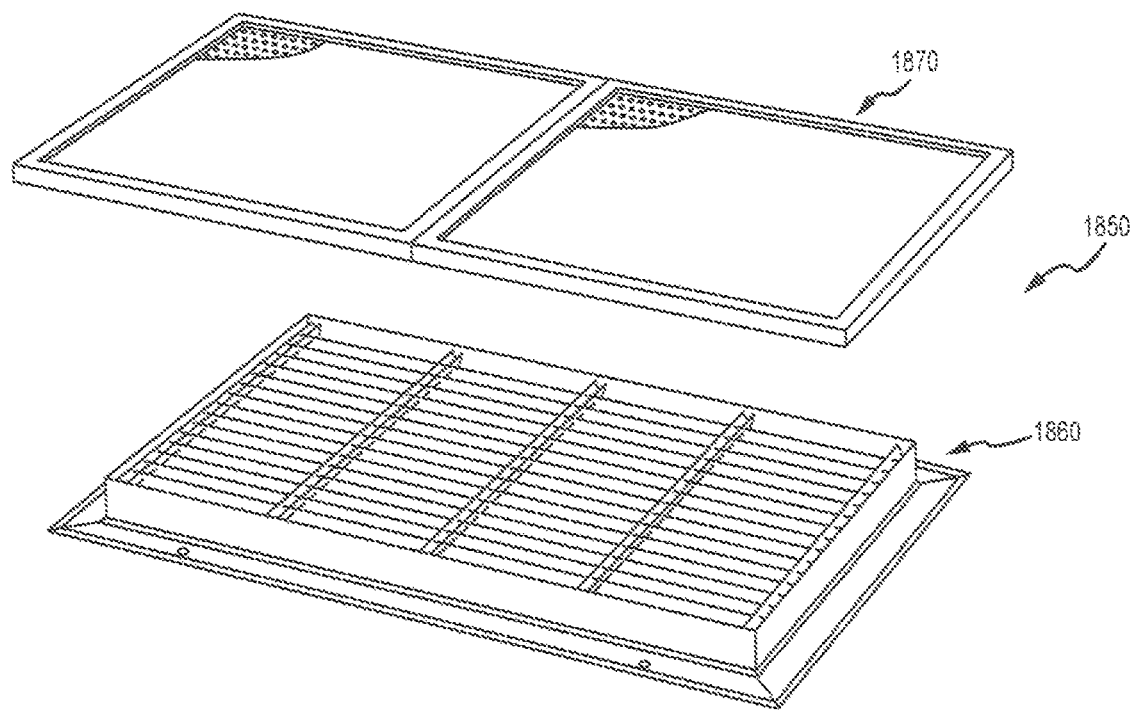
FIG. 35 is a side, perspective, exploded, partial cutaway view of a return air grill with a filter including an air flow sensor.

FIG. 35 shows a return air grill 1850 with a grill 1860 and one or more filters 1870. In the embodiment shown, the filters are monitored by air-flow sensors in one of the ways previously described.

Portable Unit

Figure 36:
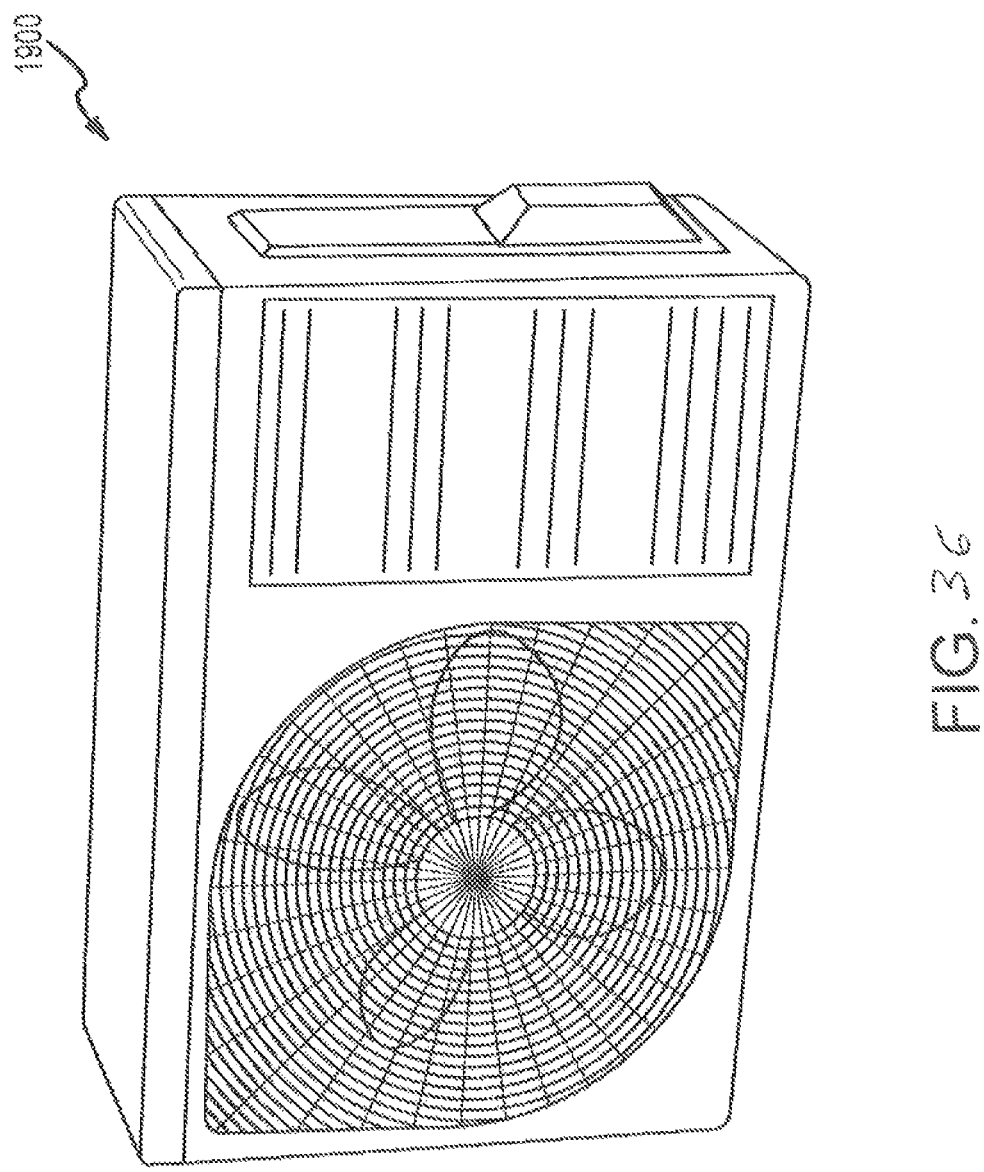
FIG. 36 is a side, perspective view of a portable air ionization unit in accordance with aspects of this disclosure.

FIG. 36 shows a portable ionization unit 900 that utilizes ionization air cleaning according to the invention. Unit 1900 is portable and can be moved from room to room or building to building. It can be small enough to fit into a suitcase. Unit 1900 ionizes air in one of the manners previously described and otherwise functions in a manner previously described.

Alternate Ozone Removal Assembly Configurations

Any module, such as module 100, 1500, 1500', 1600, 1650, 1680, 1700, 1770, or 1800 could have any suitable clean air filter size or configuration (which are optional, but preferred) and also any suitable ozone removal assembly size or configuration, as long as the ionized air passes through the ozone removal assembly after being ionized.

Any suitable air cleaner can be used to practice the inventions of this disclosure, which is not limited to air cleaning utilizing ionization. Some examples are air cleaners that use one or more of filters, hydrogen peroxide, isopropyl alcohol, ethyl alcohol, methyl alcohol, humidity greater than a humidity of the air, ultraviolet light, and/or heat.

As used herein, the terms "comprises," "comprising," or any other variation thereof, are intended to cover a non-exclusive inclusion, such that a process, method, article, or apparatus that comprises a list of limitations does not include only those elements but may include other limitations not expressly listed to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

Following are some non-limiting examples of this disclosure:

Example 1: An air cleaning system comprising:
(a) an air cleaner;
(b) one or more outside sensors;
(c) one or more inside sensors;
(d) a processor in communication with the one or more outside sensors, the one or more inside sensors, and the air cleaner, wherein the processor is configured to operate the air cleaner based at least in part on measurements received from one or both of the one or more outside sensors and the one or more inside sensors, or based at least in part on a manual command Example 2: The air cleaning system of example 1, wherein the processor is configured to operate the air cleaner at least in part based on a comparison of at least one measurement received from the one more outside sensors to at least one measurement received from the one more inside sensors.

Example 3: The air cleaning system of any one of examples 1-2, wherein the processor is configured to operate the air cleaner at least in part based on a comparison of a plurality of measurements received from the one or more outside sensors to a plurality of measurements received from the one or more inside sensors.

Example 4: The air cleaning system of any one of examples 1-3, wherein the processor is configured to operate the air cleaner at least in part based on a comparison of at least one measurement received from the one or more outside sensors.

Example 5: The air cleaning system of any one of examples 1-4, wherein the processor is configured to operate the air cleaner at least in part based on a comparison of a plurality of measurements received from the one or more outside sensors.

Example 6: The air cleaning system of any one of examples 1-5, wherein the air cleaner includes an air ionization unit.

Example 7: The air cleaning system of example 6, wherein the air cleaner further includes an ozone filter.

Example 8: The air ionization system of any one of examples 1-7, wherein the air cleaner utilizes at least one of: (a) a humidity greater than a humidity of the air being cleaned, (b) ultraviolet (UV) light, (c) heat, (d) a sanitizer, (e) an ionization unit, and (f) a filter.

Example 9: The air cleaning system of any one of examples 1-8, wherein the one or more outside sensors are configured to measure one or more of: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), and (15) the amount of silane ($SH_4$).

Example 10: The air cleaning system of any one of examples 1-9, wherein the one or more inside sensors are configured to measure one or more of: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), and (15) the amount of silane ($SH_4$).

Example 11: The air cleaning system of any one of examples 1-10, wherein the one or more inside sensors include one or more sensors configured to measure whether one or more doors or windows that separate an inside air space from the outside is open and by how much each is open.

Example 12: The air cleaning system of any one of examples 1-11, wherein the one or more inside sensors include one or more sensors that measure when and how often one or more doors that separate the inside air space from the outside are opened.

Example 13: The air cleaning system of any one of examples 1-12 that further includes a memory configured for storing information indicative of the rate at which outside air will enter the inside space, wherein the memory is further configured to communicate the information to the processor.

Example 14: The air cleaning system of example 13, wherein the information comprises one or more of (a) a temperature, (b) an outside air speed, (c) whether and the amount by which any windows or doors between the inside air space and the outside are open, and (d) opening and closing of doors that lead from the outside to the inside air space.

Example 15: The air cleaning system of any one of examples 1-15 that further includes a memory configured to store information indicative of the amount of filtering required to clean air having parameters similar or equal to the measured parameters of the outside air, and configured to communicate the information to the processor.

Example 16: The air cleaning system of example 15, wherein the memory is further configured to store information indicative of the amount of filtering required to clean air having parameters equal or similar to currently measured parameters of the outside air, and configured to communicate the information to the processor.

Example 17: The air cleaning system of example 15, wherein the memory is further configured to store information indicative of the amount of filtering required to clean air having parameters equal or similar to currently measured parameters of the outside air, and configured to communicate the information to the processor.

Example 18: The air cleaning system of example 8, wherein the sanitizer comprises one or more of: hydrogen peroxide, isopropyl alcohol, ethyl alcohol, and methyl alcohol.

Example 19: The air cleaning system of any one of examples 1-18, wherein at least one of the one or more outside sensors and at least one of the one or more inside sensors are configured to communicate wirelessly with the processor.

Example 20: The air cleaning system of any one of examples 1-19, wherein at least one of the one or more outside sensors and at least one of the one or more inside sensors communicate with the processor through a wired connection.

Example 21: The air cleaning system of any one of examples 1-20 that further includes a memory configured to store information related to: (a) the time it takes for an amount of outside air to enter the inside air space based on one or more of outside temperature, outside wind speed, whether one or more window or doors are open, and the time and frequency at which doors leading from the inside air space to the outside are opened, and (b) the past functioning of the air cleaner required to clean air with certain parameters.

Example 22: The air cleaning system of example 17, wherein the stored information may also be used by the processor to at least partially control the operation of the air cleaner.

Example 23: The air cleaning system of any one of examples 1-22, wherein the inside space is in one of the group consisting of: a building, a car, a train, a boat, a bus, and an airplane.

Example 24: The air cleaning system of any one of examples 1-23, wherein the one or more outside air sensors send parameters to the processor via an Internet connection.

Example 25: The air cleaning system of any one of examples 1-24, wherein the one or more inside sensors are positioned in an inside air space and the one or more outside sensors are positioned outside of the inside air space.

Example 26: The air cleaning system of any one of examples 1-24, wherein the inside air space is inside of a building and the one or more outside sensors are outside of the building.

Further non-limiting examples of this disclosure are as follows:

1. Example 1: A method for controlling air quality, the method comprising the following steps:
   (a) measuring one or more outside air parameters;
   (b) communicating the one or more outside air parameters to a processor, and operating by a command from the processor, an air cleaner based on the one or more measured outside air parameters.
2. Example 2: The method of example 1 that further includes the following steps:
   (a) measuring one or more inside air parameters;
   (b) comparing at least one of the one or more outside air parameters to at least one of the one or more inside air parameters to create a comparison; and
   (c) operating the air cleaner based at least in part on the comparison.

Example 3: The method of example 2, wherein the one or more inside air parameters include one or more of: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), and (15) the amount of silane ($SH_4$).

Example 4: The method of any one of examples 1-3, wherein the one or more outside air parameters include one or more of: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), (15) the amount of silane ($SH_4$), and (16) wind speed.

Example 5: The method of any one of examples 1-4 that further includes the step of measuring one or more of: (a) whether a window or door is open and by how much it is open, and (b) when and the frequency of opening one or more doors that lead from an inside air space to the outside, and the air cleaner is also operated at least in part based upon these measurements.

Example 6: The method of any one of examples 1-5, wherein the air cleaner is located in an inside air space that includes the inside air.

Example 7: The method of any one of examples 1-6, wherein the air cleaner circulates air from an inside air space, through the air cleaner, and back into the inside air space.

Example 8: The method of any one of examples 1-7, wherein the air cleaner circulates air from an inside air space, through the air cleaner, and back into the inside air space.

Example 9: The method of any one of examples 1-8, wherein the air cleaner includes an ion generator configured to generate ions into the air.

Example 10: The method of example 9, wherein the air cleaner further includes an ozone filter configured to remove a least some ozone from the ionized air.

Example 11: The method of any one of examples 1-10, wherein the one or more outside air parameters are measured by one or more sensors.

Example 12: The method of any one of examples 1-11, wherein the one or more inside air parameters are measured by one or more sensors positioned in the inside space.

Example 13: The method of example 10, wherein at least one of the sensors determines a type of particle.

Example 14: The method of example 10, wherein at least one of the sensors determines a size of the particles.

Example 15: The method of example 10, wherein at least one of the sensors measures an amount of viruses and/or amount of bacteria.

Example 16: The method of any one of examples 1-15 that further includes the step of a processor controlling a transformer in the air cleaner to change an amount of ionization.

Example 17: The method of any one of examples 1-16, wherein the air cleaner comprises one or more air filters.

Example 18: The method of any one of examples 1-17 that further includes the step of measuring an ion amount in the air and operating the one or more ion generators to produce fewer or more ions based at least in part on the measured ion amount.

Example 19: The method of any one of examples 1-18, wherein the air cleaner utilizes one or more of the following to clean the air: (i) a humidity greater than a humidity of the air, (ii) ultraviolet light, (ii) heat, (iv) a sanitizer, and (v) a filter.

Example 20: The method of example 19, wherein the sanitizer comprises hydrogen peroxide, isopropyl alcohol, ethyl alcohol, and/or methyl alcohol.

Example 21: The method of any one of examples 1-20 that further includes the step of storing, in a memory, information related to: (a) the time it takes for an amount of outside air to enter the inside air space by measuring one or more of outside air temperature, outside air wind speed, whether one or more window or doors are open, and the time and frequency at which doors leading from the inside air space to the outside are opened, and (b) the past functioning of the air cleaner required to clean air with certain parameters.

Example 22: The method of example 21 that further includes the step of the stored information being communicated to the processor.

Example 23: The method of any one of examples 1-22 that further includes the step of storing information indicative of the amount of filtering required to clean air having parameters equal to the measured parameters of the outside air, and configured to communicate the information to the processor.

Example 24: The method of any one of examples 1-23 that does not include measuring one or more inside air parameters.

Example 25: The method of any one of examples 1-24, wherein the one or more outside air sensors send parameters to the processor via an Internet connection.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:
1. An air cleaning system comprising:
   (a) an air cleaner;

(b) a first outside sensor configured to measure an outside air temperature;

(c) a second outside sensor configured to measure an outside air speed;

(d) a third outside sensor configured to measure an outside air particulate level;

(e) one or more inside sensors, wherein at least one of the first outside sensor, the second outside sensor, the third outside sensor, or at least one of the one or more inside sensors measures information indicative of a rate at which outside air enters an inside air space;

(f) a processor in communication with the first outside sensor, the second outside sensor, the third outside sensor, the one or more inside sensors, and the air cleaner, wherein the processor is configured to;
  determine the rate at which the outside air enters into the inside air space based on at least one of the first outside sensor, the second outside sensor, or the third outside sensor; and
  operate the air cleaner based at least in part on the rate at which the outside air enters into the inside air space; and (g) a memory configured for storing historical data of the first outside sensor, the second outside sensor, the third outside sensor, and the rate at which outside air will enter the inside air space, wherein the memory is further configured to communicate with the processor and provide the historical data to the processor, and wherein the processor is further configured to operate the air cleaner based on the historical data.

2. The air cleaning system of claim 1, wherein the processor is configured to operate the air cleaner at least in part based on a comparison of at least one measurement received from the first outside sensor, the second outside sensor, or the third outside sensor to at least one measurement received from the one or more inside sensors.

3. The air cleaning system of claim 1, wherein the processor is configured to operate the air cleaner at least in part based on a comparison of a plurality of measurements received from the first outside sensor, the second outside sensor, or the third outside sensor to a plurality of measurements received from the one or more inside sensors.

4. The air cleaning system of claim 1, wherein the processor is configured to operate the air cleaner at least in part based on a comparison of at least one measurement received from the first outside sensor, the second outside sensor, or the third outside sensor.

5. The air cleaning system of claim 1, wherein the processor is configured to operate the air cleaner at least in part based on a comparison of a plurality of measurements received from the first outside sensor, the second outside sensor, or the third outside sensor.

6. The air cleaning system of claim 1, wherein the air cleaner includes an air ionization unit.

7. The air cleaning system of claim 6, wherein the air cleaner further includes an ozone filter.

8. The air cleaning system of claim 1, wherein the air cleaner utilizes at least one of: (a) a humidity greater than a humidity of the air being cleaned, (b) ultraviolet (UV) light, (c) heat, (d) a sanitizer, (e) an ionization unit, and (f) a filter.

9. The air cleaning system of claim 8, wherein the sanitizer comprises one or more of: hydrogen peroxide, isopropyl alcohol, ethyl alcohol, and methyl alcohol.

10. The air cleaning system of claim 9, wherein the stored information is used by the processor to at least partially control the operation of the air cleaner.

11. The air cleaning system of claim 1, further comprising one or more outside sensors configured to measure one or more of: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), and (15) the amount of silane ($SH_4$), and (16) wind speed.

12. The air cleaning system of claim 1, wherein the one or more inside sensors are configured to measure one or more of: (1) humidity, (2) the amount of sulfur dioxide ($SO_2$), (3) the amount of volatile organic chemicals (VOC), (4) the amount of carbon dioxide ($CO_2$), (5) air temperature, (6) the amount of nitrogen oxide (NO), (7) particulate amount, (8) particulate size, (9) the amount of nitrogen dioxide ($NO_2$), (10) particulate type (such as virus or bacteria), (11) the amount of ammonia ($NH_3$), (12) the amount of ozone ($O_3$), (13) the amount of negative and/or positive ions, (14) the amount of carbon monoxide (CO), and (15) the amount of silane ($SH_4$).

13. The air cleaning system of claim 1, wherein the one or more inside sensors include one or more sensors that measure when one or more doors or windows that separate the inside air space from an outside air space are opened.

14. The air cleaning system of claim 1, that further includes a memory configured to store information indicative of an amount of filtering required to clean air having parameters similar or equal to the measured parameters of the outside air, and configured to communicate the information to the processor.

15. The air cleaning system of claim 14, wherein the memory is further configured to store information indicative of the amount of filtering required to clean air having parameters equal or similar to currently measured parameters of the outside air, and configured to communicate the information to the processor.

16. The air cleaning system of claim 13, wherein the one or more inside sensors include one or more sensors that measure an amount by which the one or more doors or the one or more windows that separate the inside air space from the outside air space are opened.

17. The air cleaning system of claim 1, wherein at least one of the first outside sensor, the second outside sensor, or the third outside sensor and at least one of the one or more inside sensors are configured to communicate wirelessly with the processor.

18. The air cleaning system of claim 1, that further includes a memory configured to store information related to: (a) the time it takes for an amount of the outside air to enter the inside air space based on one or more of the outside air temperature, the outside air speed, the outside air particulate level, whether one or more windows or doors are open leading from the inside air space to the outside are opened, and a time and frequency at which the windows or the doors are opened, and (b) a past functioning of the air cleaner required to clean air with certain parameters.

19. The air cleaning system of claim 1, wherein the memory is resident on the processor.

20. The air cleaning system of claim 1, wherein the inside air space is in one of the group consisting of: a building, a car, a train, a boat, a bus, and an airplane.

21. The air cleaning system of claim 1, wherein the processor is further configured to predict a future air quality of the inside air space based on at least one of the first outside sensor, the second outside sensor, the third outside sensor, or the historical data.

* * * * *